US011362694B1

(12) United States Patent
Laufer et al.

(10) Patent No.: US 11,362,694 B1
(45) Date of Patent: Jun. 14, 2022

(54) SIGNAL RECONSTRUCTION FOR NON-LINEARLY DISTORTED SIGNAL

(71) Applicant: QUALCOMM Incorporated, San Diego, CA (US)

(72) Inventors: Yaron Laufer, Givat Shmuel (IL); Gideon Kutz, Ramat Hasharon (IL); Elad Meir, Ramat Gan (IL); Ory Eger, Tel Aviv (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/308,534

(22) Filed: May 5, 2021

(51) Int. Cl.
*H04B 1/12* (2006.01)
*H04L 27/26* (2006.01)

(52) U.S. Cl.
CPC ....... *H04B 1/123* (2013.01); *H04L 27/26526* (2021.01)

(58) Field of Classification Search
CPC ............. H04L 27/2623; H04L 27/2614; H04L 25/03006; H04L 27/26526; H04B 1/0475; H04B 2201/71323; H04B 10/2507; H04B 1/123
See application file for complete search history.

(56) References Cited

U.S. PATENT DOCUMENTS

| | | | | |
|---|---|---|---|---|
| 6,952,394 B1* | 10/2005 | Kim | ...................... | H04L 1/0071 370/208 |
| 2009/0034407 A1* | 2/2009 | Lindh | ................. | H04L 27/2623 370/210 |
| 2014/0106691 A1* | 4/2014 | Chapman | .................. | H03F 3/24 455/114.3 |
| 2014/0139287 A1* | 5/2014 | Oishi | .................... | H04L 27/368 330/149 |
| 2017/0141875 A1* | 5/2017 | Eliaz | ...................... | H04L 1/0006 |
| 2020/0145033 A1* | 5/2020 | Rafique | ................ | H04B 1/0475 |
| 2021/0136491 A1* | 5/2021 | Hodges | .................... | H04R 3/04 |

* cited by examiner

*Primary Examiner* — Khanh C Tran
(74) *Attorney, Agent, or Firm* — Loza & Loza, LLP

(57) ABSTRACT

Aspects relate to reconstructing a received non-linearly distorted (e.g., clipped) signal. A transmitting device may non-linearly distort a signal to be transmitted (e.g., by clipping peaks of the signal). A receiving device uses a signal reconstruction procedure to reconstruct the original signal. For example, the receiving device may estimate the non-linear distortion (e.g., due to clipped peaks) in the received signal by slicing the received signal, and applying a non-linear distortion to (e.g., clipping) the sliced signal using a threshold that corresponds to a threshold (e.g., a clipping threshold) used by the transmitting device. The receiving device may thereby generate a reconstructed signal based on this estimate of the non-linear distortion.

30 Claims, 15 Drawing Sheets

SIGNAL RECONSTRUCTION FOR NON-LINEARLY DISTORTED SIGNAL

TECHNICAL FIELD

The technology discussed below relates generally to wireless communication and, more particularly, to techniques for reconstructing a signal that has been subjected to a non-linear function (e.g., clipping).

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of another wireless communication device such as a first base station (e.g., a gNB) and/or access a second cell of a second base station.

A base station may schedule access to a cell to support access by multiple UEs. For example, a base station may allocate different resources (e.g., time domain and frequency domain resources) for different UEs operating within a cell of the base station. A UE may therefore transmit data to the base station via one or more of these allocated resources. In addition, a UE may receive data transmitted by the base station via one or more of these allocated resources.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a wireless communication device is disclosed. The method may include receiving a data signal from a second wireless communication device. The data signal is based on a first signal and includes a non-linear distortion. The method may also include scaling the data signal to provide a scaled signal, slicing the scaled signal to provide a sliced signal, scaling the sliced signal to provide a scaled sliced signal, applying a non-linear distortion function to the sliced signal to provide a second signal, generating an estimate of a non-linear distortion component of the data signal based on the second signal and the scaled sliced signal, and generating an estimate of the first signal based on the estimate of the non-linear distortion component.

In some examples, a wireless communication device may include a transceiver, a memory, and a processor coupled to the transceiver and the memory. The processor and the memory may be configured to receive a data signal from a second wireless communication device via the transceiver. The data signal is based on a first signal and includes a non-linear distortion. The processor and the memory may also be configured to scale the data signal to provide a scaled signal, slice the scaled signal to provide a sliced signal, scale the sliced signal to provide a scaled sliced signal, apply a non-linear distortion function to the sliced signal to provide a second signal, generate an estimate of a non-linear distortion component of the data signal based on the second signal and the scaled sliced signal, and generate an estimate of the first signal based on the estimate of the non-linear distortion component.

In some examples, a wireless communication device may include means for receiving a data signal from a second wireless communication device. The data signal is based on a first signal and includes a non-linear distortion. The wireless communication device may also include means for scaling the data signal to provide a scaled signal, means for slicing the scaled signal to provide a sliced signal, means for scaling the sliced signal to provide a scaled sliced signal, means for applying a non-linear distortion function to the sliced signal to provide a second signal, means for generating an estimate of a non-linear distortion component of the data signal based on the second signal and the scaled sliced signal, and means for generating an estimate of the first signal based on the estimate of the non-linear distortion component In some examples, an article of manufacture for use by a wireless communication device includes a non-transitory computer-readable medium having stored therein instructions executable by one or more processors of the wireless communication device to receive a data signal from a second wireless communication device. The data signal is based on a first signal and includes a non-linear distortion. The computer-readable medium may also have stored therein instructions executable by one or more processors of the wireless communication device to scale the data signal to provide a scaled signal, slice the scaled signal to provide a sliced signal, scale the sliced signal to provide a scaled sliced signal, apply a non-linear distortion function to the sliced signal to provide a second signal, generate an estimate of a non-linear distortion component of the data signal based on the second signal and the scaled sliced signal, and generate an estimate of the first signal based on the estimate of the non-linear distortion component.

In some examples, a method for wireless communication at a wireless communication device is disclosed. The method may include determining to provide at least one parameter to a second wireless communication device. The at least one parameter is for a non-linear distortion function of a signal reconstruction operation to be performed by the second wireless communication device on a non-linearly distorted data signal. The method may also include transmitting the at least one parameter to the second wireless communication device, generating the non-linearly distorted data signal based on a first signal, and transmitting the non-linearly distorted data signal to the second wireless communication device.

In some examples, a wireless communication device may include a transceiver, a memory, and a processor coupled to the transceiver and the memory. The processor and the memory may be configured to determine to provide at least one parameter to a second wireless communication device. The at least one parameter is for a non-linear distortion function of a signal reconstruction operation to be performed by the second wireless communication device on a non-linearly distorted data signal. The processor and the memory may also be configured to transmit the at least one parameter to the second wireless communication device via the transceiver, generate the non-linearly distorted data signal based on a first signal, and transmit the non-linearly distorted data signal to the second wireless communication device via the transceiver.

In some examples, a wireless communication device may include means for determining to provide at least one parameter to a second wireless communication device. The at least one parameter is for a non-linear distortion function of a signal reconstruction operation to be performed by the second wireless communication device on a non-linearly distorted data signal. The user equipment may also include means for transmitting the at least one parameter to the second wireless communication device, means for generating the non-linearly distorted data signal based on a first signal, and means for transmitting the non-linearly distorted data signal to the second wireless communication device.

In some examples, an article of manufacture for use by a wireless communication device includes a non-transitory computer-readable medium having stored therein instructions executable by one or more processors of the wireless communication device to determine to provide at least one parameter to a second wireless communication device. The at least one parameter is for a non-linear distortion function of a signal reconstruction operation to be performed by the second wireless communication device on a non-linearly distorted data signal. The computer-readable medium may also have stored therein instructions executable by one or more processors of the wireless communication device to transmit the at least one parameter to the second wireless communication device, generate the non-linearly distorted data signal based on a first signal, and transmit the non-linearly distorted data signal to the second wireless communication device.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
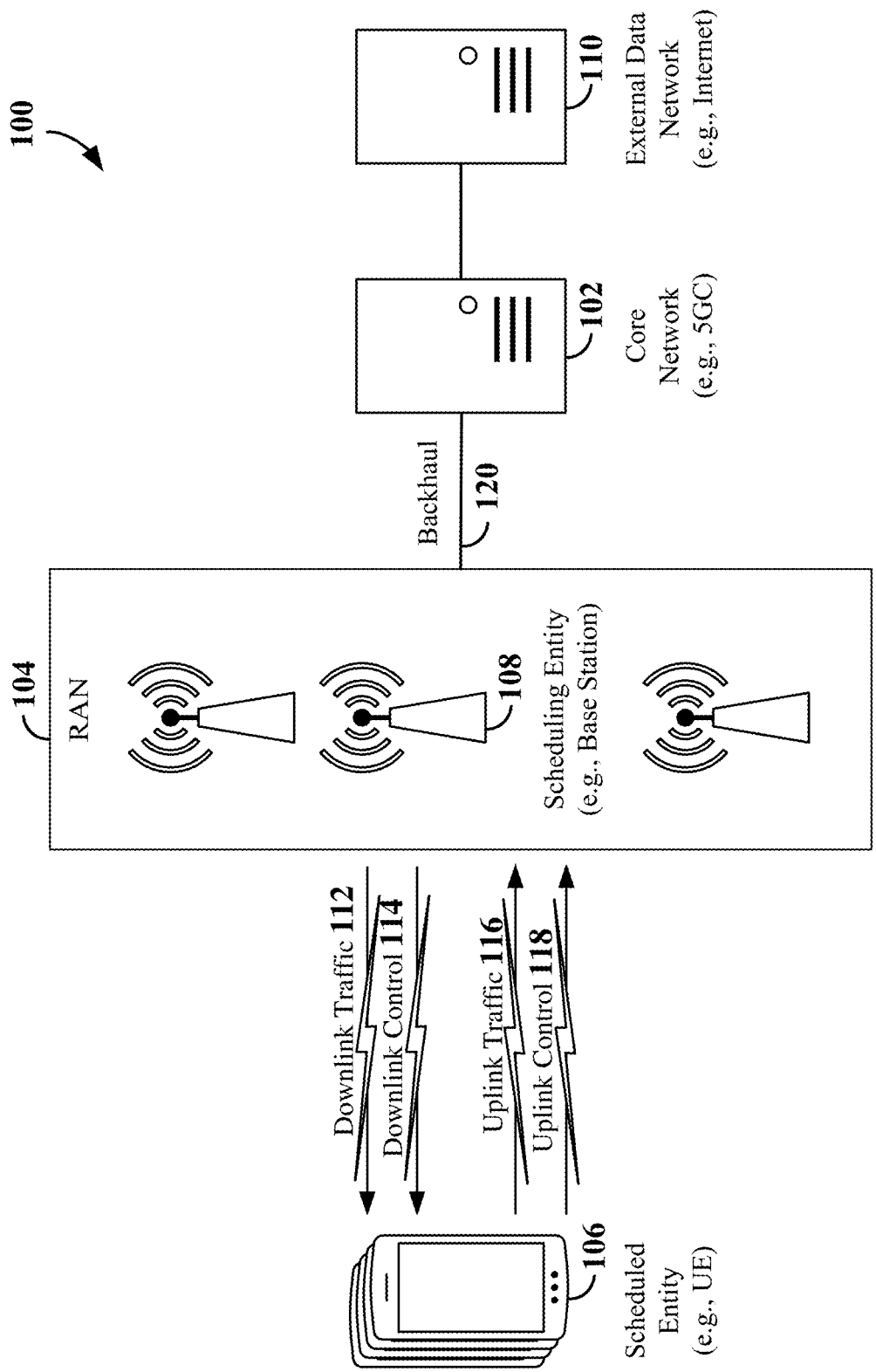
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Various aspects of the present disclosure relate to reconstructing a received data signal that has been subjected to a non-linear distortion (e.g., clipping). For example, a transmitting device may clip peaks of a data signal to be transmitted to reduce the peak-to-average power ratio (PAPR) at a power amplifier of the transmitting device. This clipping results in non-linear distortion in the transmitted data signal (e.g., carrying control information, user data, or other information), which may adversely affect the recovery of this signal by a receiving device.

According to some aspects, a receiving device may use a signal reconstruction process to reconstruct the received data signal (e.g., by reconstructing the clipped peaks of a received data signal and adding the reconstructed peaks back into the received data signal). For example, the receiving device may estimate the non-linear distortion (e.g., due to the clipped peaks) in the received data signal by performing one or more iterations of a signal reconstruction process that includes slicing the received data signal, applying a non-linear distortion to (e.g., clipping) the sliced data signal, and generating an estimate of the non-linear distortion based on the resulting (e.g., clipped) data signal.

The signal reconstruction process may reconstruct the signal based, at least in part, on knowledge of a parameter of a non-linear distortion function (e.g., the clipping threshold) used by the transmitting device. In some examples, the transmitting device sends this non-linear distortion parameter to the receiving device. In some examples, the receiving device estimates the non-linear distortion parameter used by the transmitting device. For example, the receiving device may determine a maximum amplitude of a received clipped signal and estimate the clipping threshold based on this amplitude.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
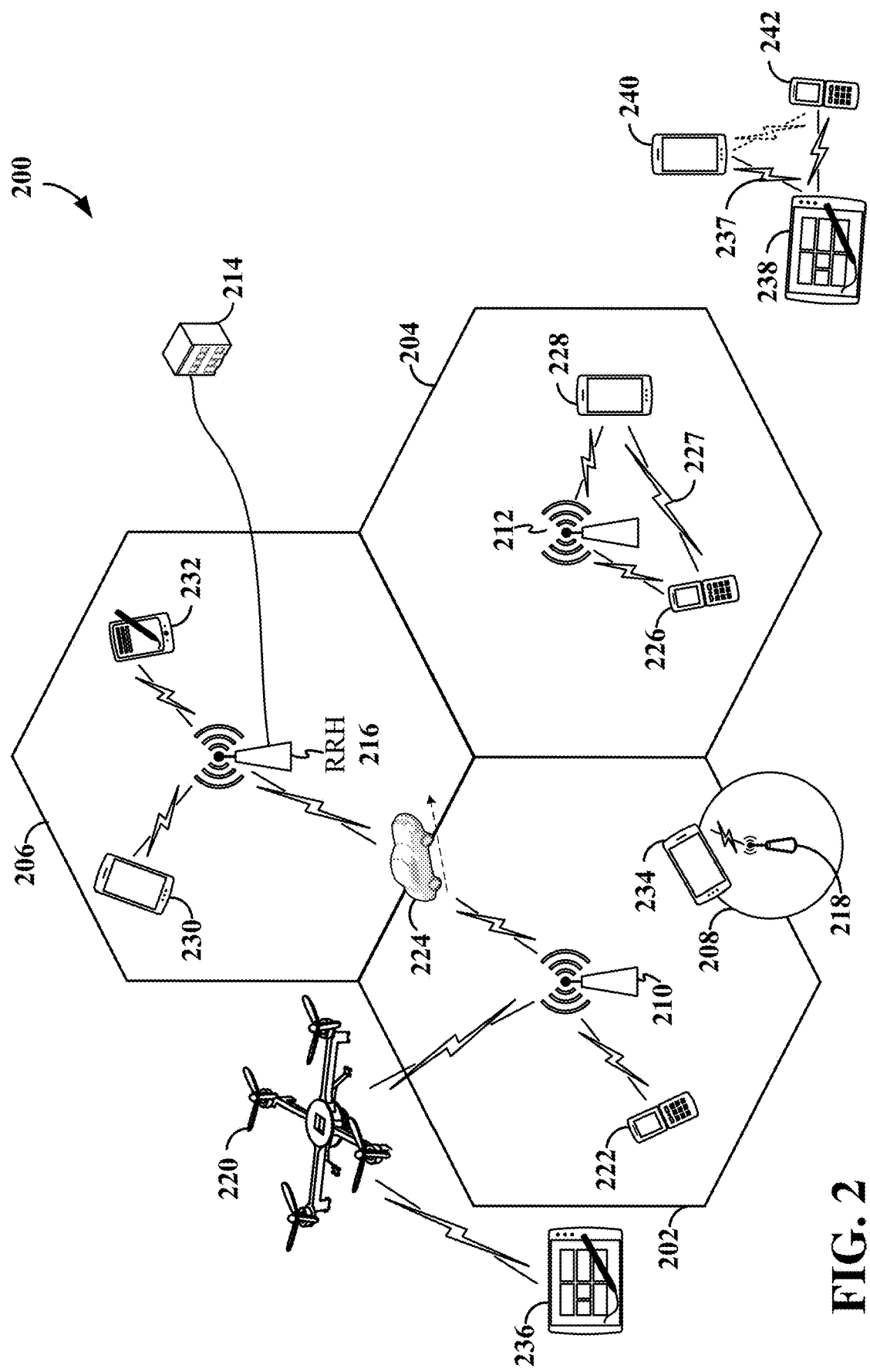
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

Figure 3:
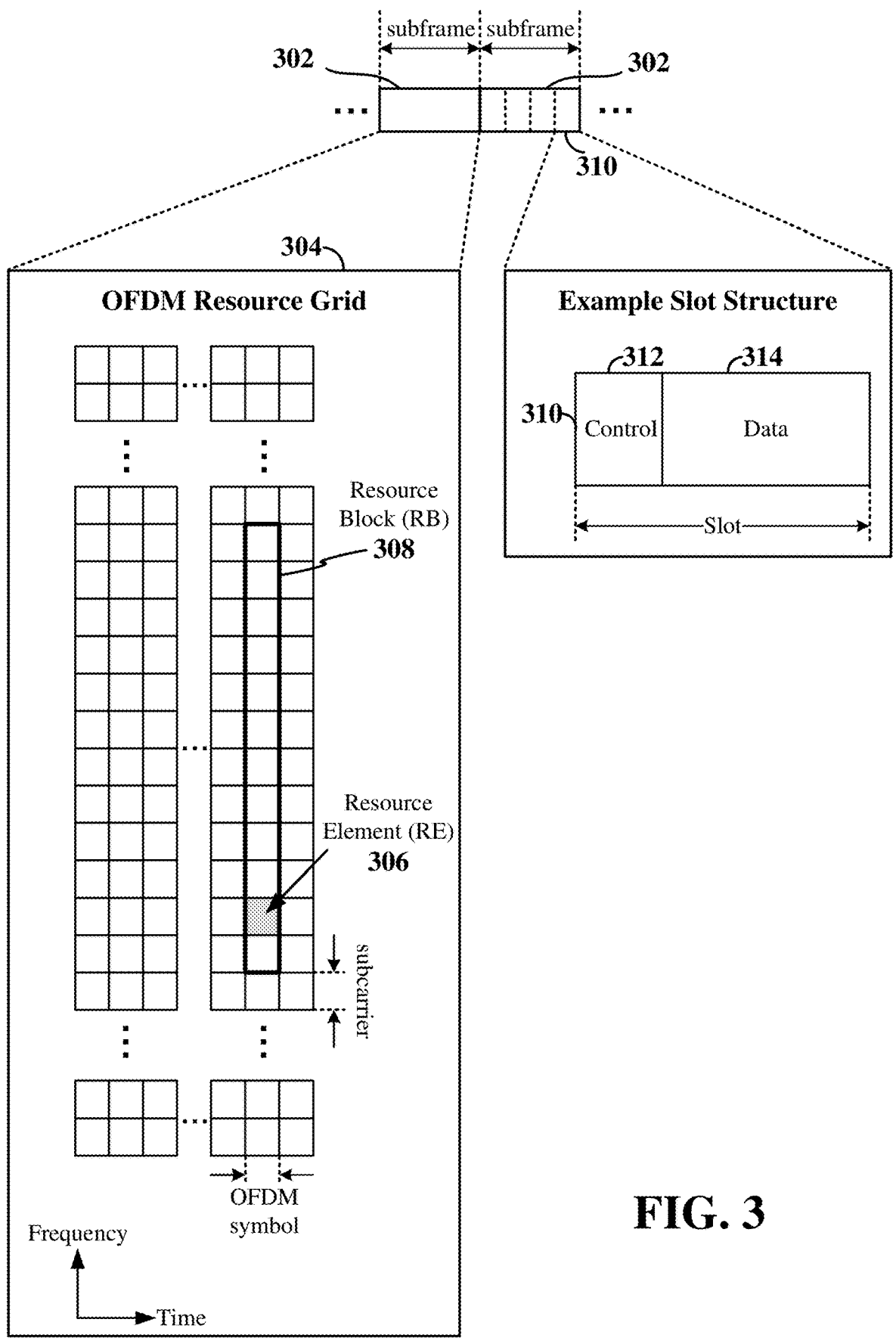
FIG. 3 is a schematic diagram illustrating organization of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14

OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS);  a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., an Rx V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
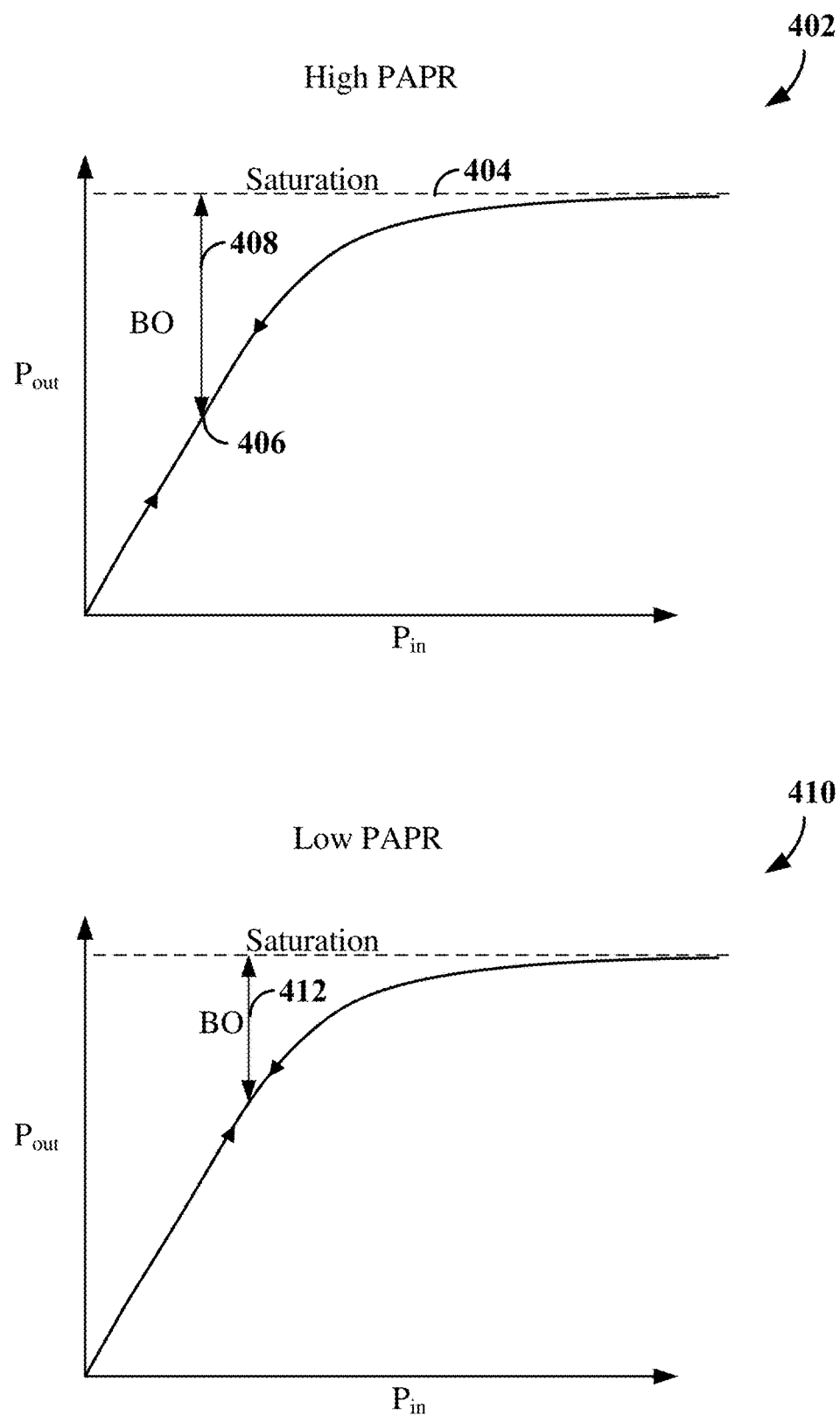
FIG. 4 is a conceptual illustration of an example of non-linearity of a power amplifier and different backoffs according to some aspects.

Power amplifiers such as those used in wireless communication devices (e.g., UEs and base stations) typically exhibit non-linear behavior at higher levels of input power. The graph 402 of FIG. 4 illustrates an example of a power out ($P_{out}$) to power in ($P_{in}$) characteristic of a power amplifier. Here, it may be seen that the amplification by the power amplifier is linear at a lower levels of Pin. As Pin increases, however, the amplification becomes non-linear and the power amplifier ultimately reaches a saturation level 404 corresponding to a maximum output power.

This amplifier-induced non-linearity may result in in-band and out-of-band distortion of the amplified signal, and a degraded (i.e., larger) error vector magnitude (EVM) at a receiver of the signal. EVM is a measure of the distance between the points on a constellation corresponding to a received signal and their ideal constellation locations. Since each constellation point represents a different phase and amplitude combination, to ensure low EVM at a transmitter, the power amplifier of the transmitter should have a sufficiently large operating range to represent the range of amplitudes in a signal to be transmitted.

To avoid this non-linearity, the power amplifier may be operated at a working point 406 that is several decibels (dBs) lower than the saturation level as represented, for example, by the backoff (BO) 408. An appropriate power level may be determined by selecting an input power that maintains the signal below a certain level. For example, a BO can be chosen to be proportional to the peak-to-average power ratio (PAPR). As another example, if a signal has a PAPR of x dB, a backoff (BO) 408 of x dB may be used to avoid the non-linearity region even at the peak of the input signal. In practice, various tradeoffs may be made in selecting a desired operating point for a power amplifier.

The use of orthogonal frequency division multiplexing (OFDM) as discussed above may enable more efficient channel estimation at the receiver and provide greater flexibly in utilizing the available time and frequency resources. However, the use of OFDM may result in a higher PAPR compared to single carrier techniques.

In addition, some applications may use a relatively high order modulation scheme such as 256 quadrature amplitude modulation (QAM), 1024 QAM or even 16K QAM for signal transmission. However, the use of a higher order modulation scheme may result in higher power consumption compared to the power consumption incurred when using a lower order modulation.

To maximize a power amplifier's power efficiency: $\mu = P\_out/P\_in$, the working point for the power amplifier may be made as close as possible to the non-linear part of the Pout to Pin curve. In scenarios where the PAPR is relatively high (e.g., OFDM scenarios), a relatively large backoff (e.g., as in the graph 402) may be used to ensure that the EVM required for higher order modulation schemes is met. However, a large backoff results in an inefficient use of the power amplifier since the highest output power achieved may be lower than the power level the power amplifier is capable of providing in its linear range. Reducing the PAPR will enable the use of a smaller BO and enable a working point with higher power efficiency, without compromising EVM.

The graph 410 of FIG. 4 illustrates an example where a smaller BO 412 is used (e.g., in a low PAPR scenario). This results in a more efficient use of the power amplifier since the highest output power achieved is closer to the power output the power amplifier is capable of providing, while still operating in the power amplifier's linear operating range.

To address these competing issues, the peaks of a signal to be transmitted may be clipped, thereby reducing the PAPR, while still using an operating point with a desired level of power efficiency. However, clipping introduces non-linear distortion into the signal which may make it more difficult for a receiving device to successfully decode the clipped signal.

The disclosure relates in some aspects to encoding and decoding techniques that enable a transmitting device (e.g., a UE or a base station) to transmit a data signal at a relatively low PAPR through the use of a non-linear function such as clipping, while enabling a receiving device (e.g., a UE or a base station) to effectively decode the received data signal. For purposes of explanation, the discussion that follows may describe examples where a non-linear function applied to a signal involves a clipping operation. It should be understood that any discussion of clipping herein could be substituted with some other type of non-linear distortion.

A transmitting device may clip peaks in a data signal (e.g., carrying control information, user data, or other information) that have relative high amplitudes. In some examples, samples of a data signal having amplitudes that exceed a threshold value may be referred to as the peaks of the data signal.

Upon receipt of the clipped data signal, the receiving device may identify the clipped peaks of the clipped signal, reconstruct these peaks, and recombine the reconstructed peaks with the clipped signal to provide a reconstructed signal. In some examples, the receiving device may perform one or more iterations of a peak reconstruction process. The iterative peak reconstruction process may reconstruct the peaks based, at least in part, on an estimate of or knowledge of the clipping threshold used by the transmitting device. In some examples, the peak reconstruction process involves a Bussgang decomposition-based peak reconstruction procedure.

The techniques described herein may be implemented, for example, to suppress the amplitudes of detected peaks in a data signal, which may substantially reduce PAPR associated with the transmission of the data signal. This reduction in PAPR enables the transmitting device to use a lower BO which, in turn, may lead to higher power efficiency of the power amplifier used to transmit the data signal. Moreover, this may be achieved while maintaining an acceptable error vector magnitude (EVM), thereby enabling a receiving device to more effectively decode a received clipped data signal. EVM is a measure of the distance between the points on a constellation diagram (used for signal modulation) and their ideal locations. Since each constellation point represents a different phase and amplitude combination, reducing the amplitudes of some of the samples of the data signal may degrade EVM at the transmitting device. However, transmitting an indication of the clipping threshold used by the transmitting device to a receiving device may enable the receiving device to effectively reconstruct the peaks in the data signal. As a result, the receiving device may demodulate and decode the data symbols of the received data signal without substantial loss of precision or accuracy. Accordingly, some of the techniques described herein may provide for relatively improved power efficiency at the transmitting device while maintaining a relatively low EVM at the receiving device.

Figure 5:
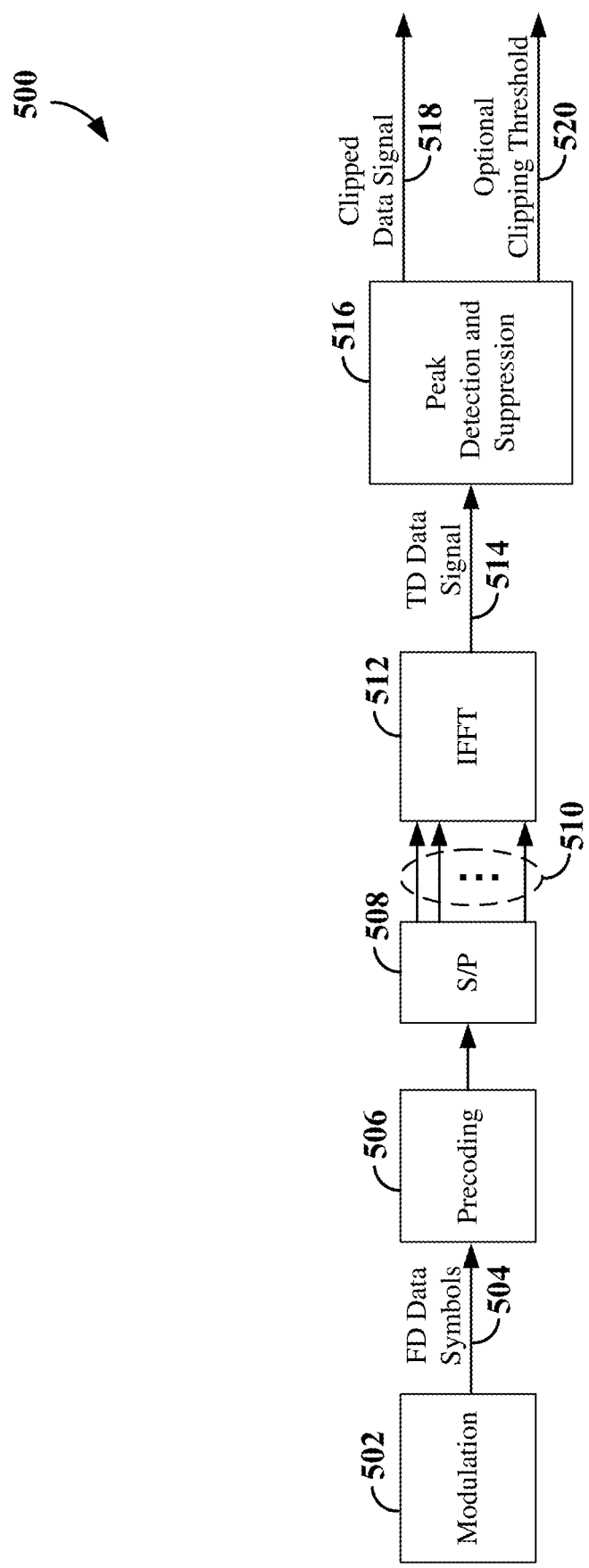
FIG. 5 is a schematic illustration of an example of a transmit chain according to some aspects.

FIG. 5 illustrates an example transmit chain 500 of a transceiver that clips a data signal to be transmitted (e.g., by suppressing all of the amplitudes of a signal that exceed a threshold amplitude level) and transmits the data signal to a receiving device. To reduce the complexity of FIG. 5, some of the components (e.g. amplifiers, filters, etc.) of the transmit chain 500 are not shown. Initially, a modulation circuit 502 generates modulated frequency domain (FD) data symbols 504 representing the data to be sent to a receiving device. For example, for QAM-based modulation, each FD data symbol 504 may constitute in-phase (I) and quadrature (Q) components of the original data signal. A precoding circuit 506 may apply a precoding matrix to the frequency domain data symbols 504 (e.g., to reduce the channel). A serial-to-parallel circuit 508 converts the serial stream for the symbols 504 into several parallel streams 510. An inverse fast Fourier transform (IFFT) circuit 512 converts the frequency domain symbols from the parallel streams 510 into a time domain (TD) data signal 514. For example, for QAM-based modulation, each TD data signal 514 may constitute in-phase (I) and quadrature (Q) samples, i.e., time domain IQ samples. For convenience, time domain IQ samples may be referred to as samples herein.

Figure 6A:
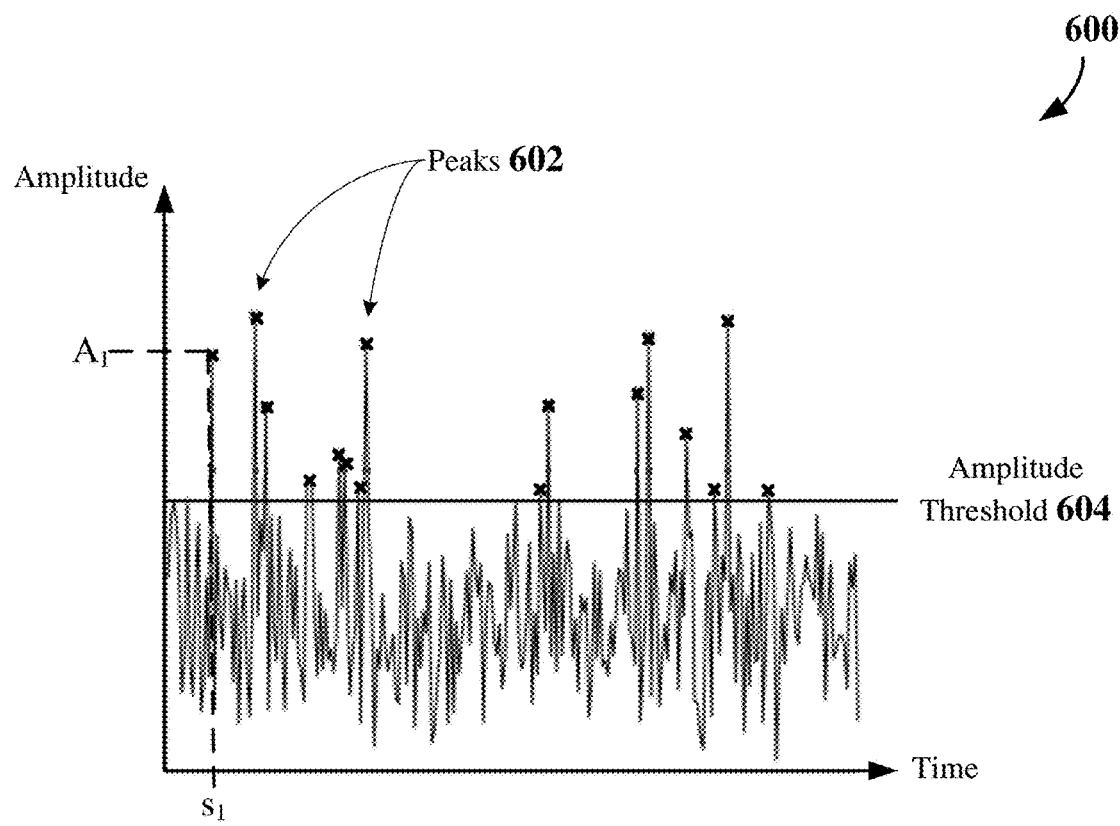
FIG. 6A is a conceptual illustration of an example of a data signal including peaks according to some aspects.

A peak detection and suppression circuit 516 detects one or more peaks of the time domain data signal 514. As used herein, the term "peak" may refer to any sample of a data signal (e.g., as produced by an IFFT) having an amplitude that exceeds a threshold amplitude level. FIG. 6A illustrates an example of a time domain data signal 600. As shown, the time domain data signal 600 includes several peaks (e.g., peaks 602) that exceed an amplitude threshold 604.

Figure 6B:
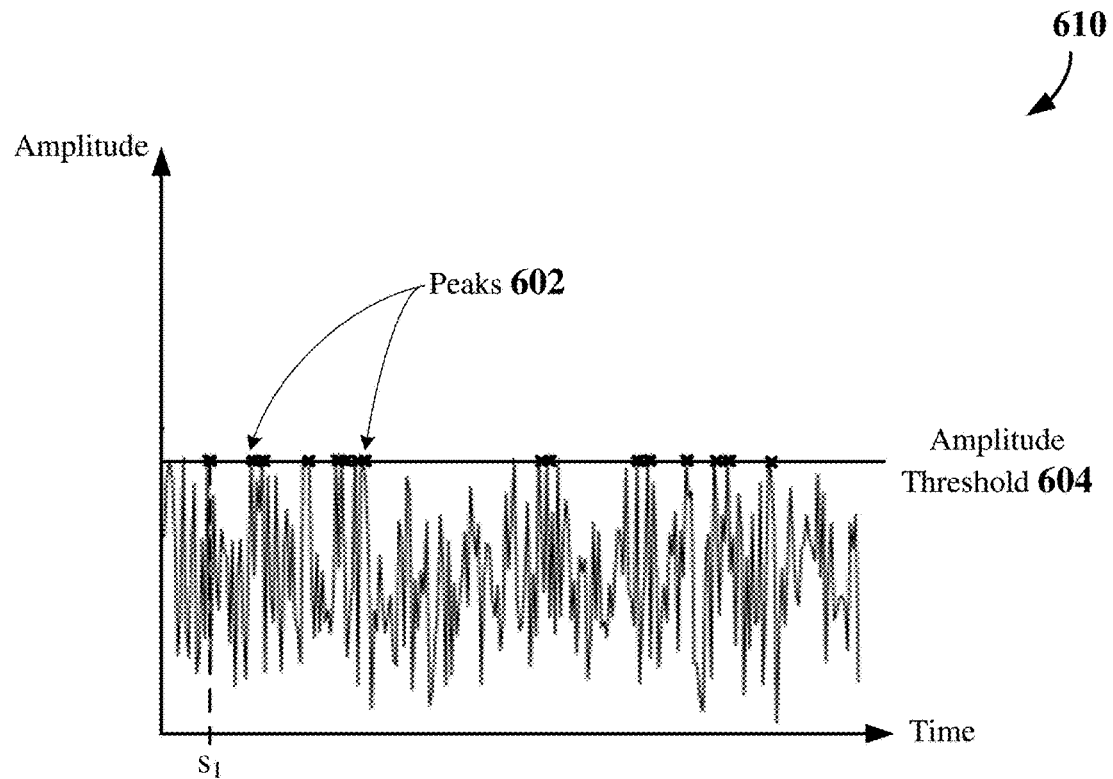
FIG. 6B is a conceptual illustration of an example of clipped peaks for the signal of FIG. 6B according to some aspects.

The peak detection and suppression circuit 516 may then clip the time domain data signal 514 by, for example, reducing the amplitudes of the samples associated with the detected peaks. In some examples, the peak detection and suppression circuit 516 clips all samples that exceed a threshold. FIG. 6B illustrates an example of a time domain data signal 610 after such a clipping operation. Here, it may be seen that the magnitudes of the peaks (e.g., peaks 602) that exceeded the amplitude threshold 604 have been reduced so that the maximum values of these peaks are at the amplitude threshold 604. The peak detection and suppression circuit 516 outputs the resulting clipped data signal 518 (e.g., the time domain data signal 610 of FIG. 6B) for transmission to a receiving device.

In some examples, the peak detection and suppression circuit 516 may also output a clipping threshold 520 to be transmitted to the receiving device. For example, the clipping threshold 520 may be the threshold (e.g., the amplitude threshold 604 of FIG. 6B) that was used to clip the time domain data signal 514.

Figure 7:
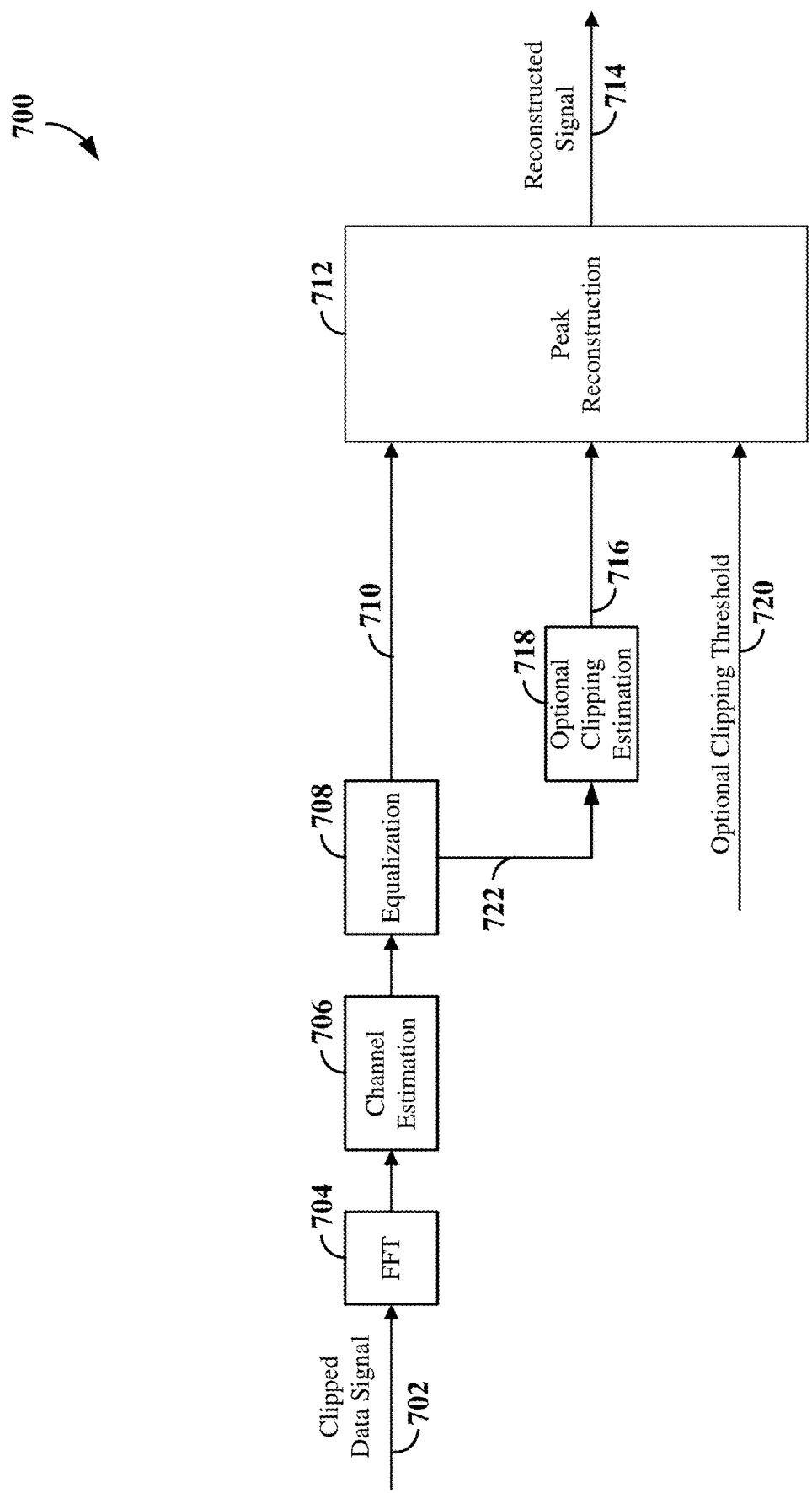
FIG. 7 is a schematic illustration of an example of a receive chain according to some aspects.

FIG. 7 illustrates an example receive chain 700 of a transceiver that uses a reconstruction process for processing a clipped data signal 702 received from a transmitting device. The clipped data signal 702 may correspond to the clipped data signal 518 of FIG. 5. To reduce the complexity of FIG. 7, some of the components (e.g. amplifiers, filters, etc.) of the receive chain 700 are not shown.

A fast Fourier transform (FFT) circuit 704 converts the clipped data signal 702 to a frequency domain signal. A channel estimation circuit 706 estimates the channel between the transmitting device and the receiving device (e.g., based on reference signals received from the transmitting device and/or the received clipped data signal 702). An equalization circuit 708 equalizes the frequency domain signal (e.g., to correct for distortion induced by the channel) and provides the resulting signal 710 to a peak reconstruction circuit 712.

The peak reconstruction circuit 712 generates a reconstructed signal 714 based on the signal 710 and based on an estimated clipping threshold 716 generated by a clipping estimation circuit 718 or a threshold 720 received from the transmitting device. The peak reconstruction circuit 712 may use a decision-directed peak reconstruction process to generate the reconstructed signal 714. In some examples, the decision-directed peak reconstruction process may include multiple iterations where the peak reconstruction circuit 712 iteratively reconstructs the peaks in a successive manner until reaching a pre-defined iteration limit, or satisfying a criterion indicating to the peak reconstruction circuit 712 not to perform further iterations. In some examples, the iterative process is ceased when the error associated with the slicing is below a threshold error level. Once the reconstructed signal 714 is generated, the receive chain 700 completes the demodulation of the data and decodes the data. In some examples, an inverse precoding circuit (not shown) of the receive chain 700 may apply an inverse precoding matrix to the reconstructed signal 714. For example, the inverse precoding circuit may revert any precoding that was applied at the transmitting device (e.g., expands the channel to obtain the full channel).

In some examples, the clipping estimation circuit 718 estimates the clipping threshold used by the transmitting device based on the clipped data signal 702. For example, the clipping estimation circuit 718 may convert the equalized signal 722 provided by the equalization circuit 708 to the time domain and determine a maximum amplitude of the time domain signal. The clipping estimation circuit 718 may then generate the estimated clipping threshold 716 based on this maximum amplitude. In some examples, the estimated clipping threshold 716 is set equal to the maximum amplitude. In some examples, the estimated clipping threshold 716 is calculated as a function of the maximum amplitude (e.g., an average of the maximum amplitude over time).

In some examples, the transmission of the clipping threshold 720 by a transmitting device may be dynamically enabled or disabled. For example, under a high SNR condition, a receiving device (e.g., the clipping estimation circuit 718) may be able to accurately estimate the clipping threshold on its own. In this case, the transmission of the clipping threshold 720 by a transmitting device may be disabled to reduce signaling overhead.

Conversely, under a low SNR condition, a receiving device may not be able accurately estimate the clipping threshold on its own. In this case, the transmission of the clipping threshold 720 by a transmitting device may be enabled to improve the decoding performance of the receiving device.

In some examples, the decision-directed peak reconstruction process involves a Bussgang decomposition-based peak reconstruction procedure as set forth in Table 1.

TABLE 1

Decomposition based on: $y(x) = G(x) = ax + d$
$a = \arg\min E[|y - ax|^2]$
Initialize: $\hat{d}=0$
Iterations loop:

| | Correction: | $y_{corrected} = y - \hat{d}$ |
|---|---|---|
| | Decision: | $\hat{x} = \text{ifft}\left(\text{Slicer}\left(\text{fft}\left(\frac{y_{corrected}}{\alpha}\right)\right)\right)$ |
| | Estimation: | $\hat{d} = \text{Clipping}(\hat{x}) - a\hat{x}$ |

Output: $y_{corrected}$

Here, y(x) is the received signal at a receiving device after channel equalization (e.g., the signal 710 of FIG. 7). The signal y(x) (i.e., y) is based on the original data signal x (e.g., the signal modulated by the modulation circuit 502 of FIG. 5). As discussed above, the original data signal x is subject to non-linear distortion (e.g., the clipping performed by the peak detection and suppression circuit 516 of FIG. 5). The term G(x) represents that the original data signal x is subjected to a non-linear distortion.

The distorted signal may be considered a scaled version of x (e.g., ax) with a non-linear distortion component d. In some examples, the scaling factor α might be Bussgang coefficient. In Table 1, the Bussgang coefficient $\alpha = \arg\min E[|y-ax|^2]$. In a Bussgang decomposition y=ax+d, the linear term x and the non-linear distortion component d are orthogonal to each other. The manner in which a is calculated, namely $\alpha = \arg\min E[|y-ax|^2]$, guarantees this orthogonality. This can be shown by taking the derivative of the expression and comparing it to zero (0).

The parameter $\hat{d}$ in Table 1 may represent the clipping that occurred at the transmitting device. The peak reconstruction procedure involves estimating the non-linear distortion $\hat{d}$ in the received signal. With each iteration of the loop, a more accurate estimate of x and $\hat{d}$ can be obtained.

Initially, $\hat{d}$ is set to 0. The iterative process then starts at the Correction phase where $\hat{d}$ is subtracted from the received signal y. At the Decision (e.g., Slicing) phase, the resulting $y_{corrected}$ value is scaled by 1/α, converted to the frequency domain (e.g., to obtain the constellation representation of the OFDM symbol), and then sliced (e.g., to estimate a value of the signal) using knowledge of the modulation (e.g., 64 QAM, 256 QAM, etc.) used by the transmitting device. This result is converted back to the time domain to get the estimated signal $\hat{x}$. The slicing operation of the Decision phase may take different forms in different examples. In some examples, the slicing operation is a hard slicing operation. In some examples, the slicing operation is a soft slicing operation. In some examples, the slicing operation is a transparent slicing operation. In some aspects, transparent slicing means that the output of the slicing function equals the input.

At the Estimation phase, the reconstruction process applies the same non-linear distortion (e.g., the same clipping threshold) to z as the transmitting device applied to the original data signal x. Here, by removing a scaled version of 2 from the clipped signal, a new estimation of $\hat{d}$ is obtained. In the next iteration of the loop, this value of $\hat{d}$ is removed from y at the Correction phase to get a better estimate of $y_{corrected}$.

The iteration loop may be performed one or more times (e.g., depending on the desired level of performance). In some examples, the iteration loop is performed a defined number of times (e.g., once, twice, etc.).

In some examples, the iteration loop is performed until a defined criterion (e.g., convergence) is met. For example, the iterations may be stopped if the means square error (MSE) as measured at the output of the slicer is less than or equal to an error threshold.

The threshold used in the above Estimation phase may be obtained in different ways in different examples. As mentioned above, in some examples, a receiving device receives an indication of the threshold from the transmitting device. As also mentioned above, the receiving device may estimate the threshold that was used by the transmitting device (e.g., based on a maximum amplitude of the received clipped signal).

Furthermore, in some examples, the transmitting device may select a threshold to use based on an adjacent channel leakage ratio (ACLR) requirement, an EVM requirement, or some other requirement(s). For example, a particular ACLR limit may correspond to a particular PAPR. The level of clipping dictates the resulting PAPR and affects the amount of spectral leakage, namely ACLR. Thus, given a specific ACLR requirement (e.g., an upper bound on the ACLR), the clipping level may be limited accordingly, thereby providing limited PAPR reduction (e.g., since deep clipping that allows significant PAPR reduction will yield a high ACLR). Thus, in some aspects, the upper limit on ACLR dictates a lower limit on PAPR.

ACLR may be defined as the ratio of the amount of the transmitted power that leaks into an adjacent channel or adjacent channels over the amount of the transmitted power in a user's allocated channel (e.g., adjacent channel power÷main channel power). Thus, an ACLR limit may be specified (e.g., by the network) to prevent a transmitting device from unduly interfering with channels used by other wireless communication devices.

Table 2 illustrates an example of a relationship between PAPR values and ACLR values. As discussion above, PAPR decreases as clipping goes deeper (e.g., the threshold level decreases), which in turn results in increased ACLR due to spectral leakage. As one example, if the ACLR upper limit is −34.3 dB (e.g., at a particular frequency), then the minimum allowed PAPR is 6. In such a case, the clipping threshold used by a transmitting device may be selected to ensure that the PAPR does not go below 6.

TABLE 2

| PAPR (dB) | ACLR (dB) |
|---|---|
| 9 | −42.96 |
| 8 | −41.71 |
| 7 | −38.37 |
| 6 | −34.3 |
| 5 | −30.66 |
| 4 | −27.65 |
| 3 | −25.18 |
| 2 | −23.16 |
| 1 | −21.48 |

In some examples, a requirement (e.g., an ACLR requirement) may either be static (e.g., a particular value specified by a communication standard) or dynamic. In the latter case, a transmitting device may select the ACLR to be applied based on one or more factors.

In some examples of a dynamic ACLR, a base station (e.g., a gNB) may select an ACLR based on allocations made on neighboring frequency resources. In a scenario where there are no allocations for the channels that are adjacent the channel allocated for a transmitting device (e.g., the base station or a UE served by the base station), the base station may set a higher ACLR limit (e.g., for a particular scheduled transmission) that allows more cross channel leakage. In this scenario, the cross channel leakage is less likely to adversely affect the communication performance of other wireless communication devices. Conversely, in a scenario where there are allocations for the channels that are adjacent the channel allocated for a transmitting device, the base station may set a lower ACLR limit to reduce the cross channel leakage.

In some examples of a dynamic ACLR, a base station (e.g., a gNB) may select an ACLR based on one or more transmission parameters that a second transmitting device uses to transmit on frequency resources that are adjacent the frequency resources allocated to a first transmitting device. For example, a device that uses quadrature phase shift keying (QPSK) modulation might not be as susceptible to noise and interference from neighboring devices. In this case, the base station may specify a higher ACLR (e.g., for a particular scheduled transmission) that allows more cross channel leakage. Conversely, a device that uses a higher order modulation (e.g., 256 QAM, etc.) may be more susceptible to noise and interference from neighboring devices. In this case, the base station may specify a lower ACLR to reduce the cross channel leakage.

Operations similar to those discussed above may be employed for other requirements. For example, a base station may set a dynamic EVM limit based on the current wireless communication environment.

As discussed above, in some scenarios, a wireless communication device may or may not transmit/use an indication of a clipping threshold. In addition, a wireless communication device may use a static requirement or a dynamic requirement. The disclosure relates in some aspects to the use of different configurations based on these variables, where each configuration involves different levels of transparency to a current communication standard and compliance to the current communication standard. Two configurations for transparency to the current standard are referred to as Transparent and Minimal Change. Two configurations for compliance to the current standard are referred to as Complied and Relaxed.

The transparency factor relates to how transparent the operations of a device are with respect to a particular communication standard. For example, in a Transparent configuration, the operations of a transmitting device and/or a receiving device might not require any changes to the current requirements of a standard. As one example, if a receiving device is able to estimate the clipping threshold of a received clipped signal from the maximum amplitude of the equalized signal in the time domain (e.g., in a high-SNR regime), the transmitting device does not need to send an indication of the clipping threshold it uses. Thus, the operations of the transmitting device and the receiving device do not require a change in the standard (e.g., the operations are transparent to the standard).

In a Minimal Change configuration, the operations might require a change to the current requirements of a standard. As one example, if a transmitting device transmits an indication of its clipping threshold to a receiving device (e.g., in a low-SNR regime), the operations of the transmitting device might require a change in the standard (e.g., in this case, the operations are not completely transparent to the standard).

The compliance factor relates to whether a requirement (e.g., an ACLR or EVM requirement) to be used is a specific requirement indicated by a communication standard or a dynamic requirement that can be selected by a base station or some other wireless communication device. For example, in a Complied configuration, a wireless communication device uses only the specific requirement indicated by a communication standard. As one example, a clipping level may be restricted to meet EVM and ACLR requirements. However, the use of such a static EVM and ACLR requirement may limit the amount of PAPR reduction that can be achieved (e.g., the magnitude of the clipping may be restricted).

In a Relaxed configuration, a wireless communication device may dynamically select a requirement (e.g., the value of a limit). As one example, EVM and ACLR requirements may be relaxed (e.g., as discussed above) to allow deep clipping. A significant reduction in PAPR may be achieved in this case since the peaks of the transmitted signal may be clipped to a greater extent. Note that this reduction in PAPR might not be achievable without relaxing the ACLR limit.

Table 3 illustrates an example of different modes of operation that may be specified for a wireless communication device based on the above configurations.

TABLE 3

| Mode | Send Clipping Level | Relaxed EVM/ACLR Requirements |
| --- | --- | --- |
| Transparent-Complied | x | x |
| Minimal Change-Complied | √ | x |
| Transparent-Relaxed | x | √ |
| Minimal Change-Relaxed | √ | √ |

In the Transparent-Complied mode, a transmitting device does not transmit an indication of its clipping level (e.g., the receiving device estimates the clipping threshold on its own), and the transmitting device uses the specific requirements (e.g., ACLR) indicated by a communication standard. In the Minimal Change-Complied mode, a transmitting device may transmit an indication of its clipping level and this indication may be used by a receiving device, and the transmitting device uses the specific requirements (e.g., ACLR) indicated by a communication standard. In the Transparent-Relaxed mode, a transmitting device does not transmit an indication of its clipping level, and the transmitting device may dynamically select the value of a requirement (e.g., ACLR). In the Minimal Change-Relaxed mode, a transmitting device may transmit an indication of its clipping level and this indication may be used by a receiving device, and the transmitting device may dynamically select the value of a requirement (e.g., ACLR).

Figure 8:
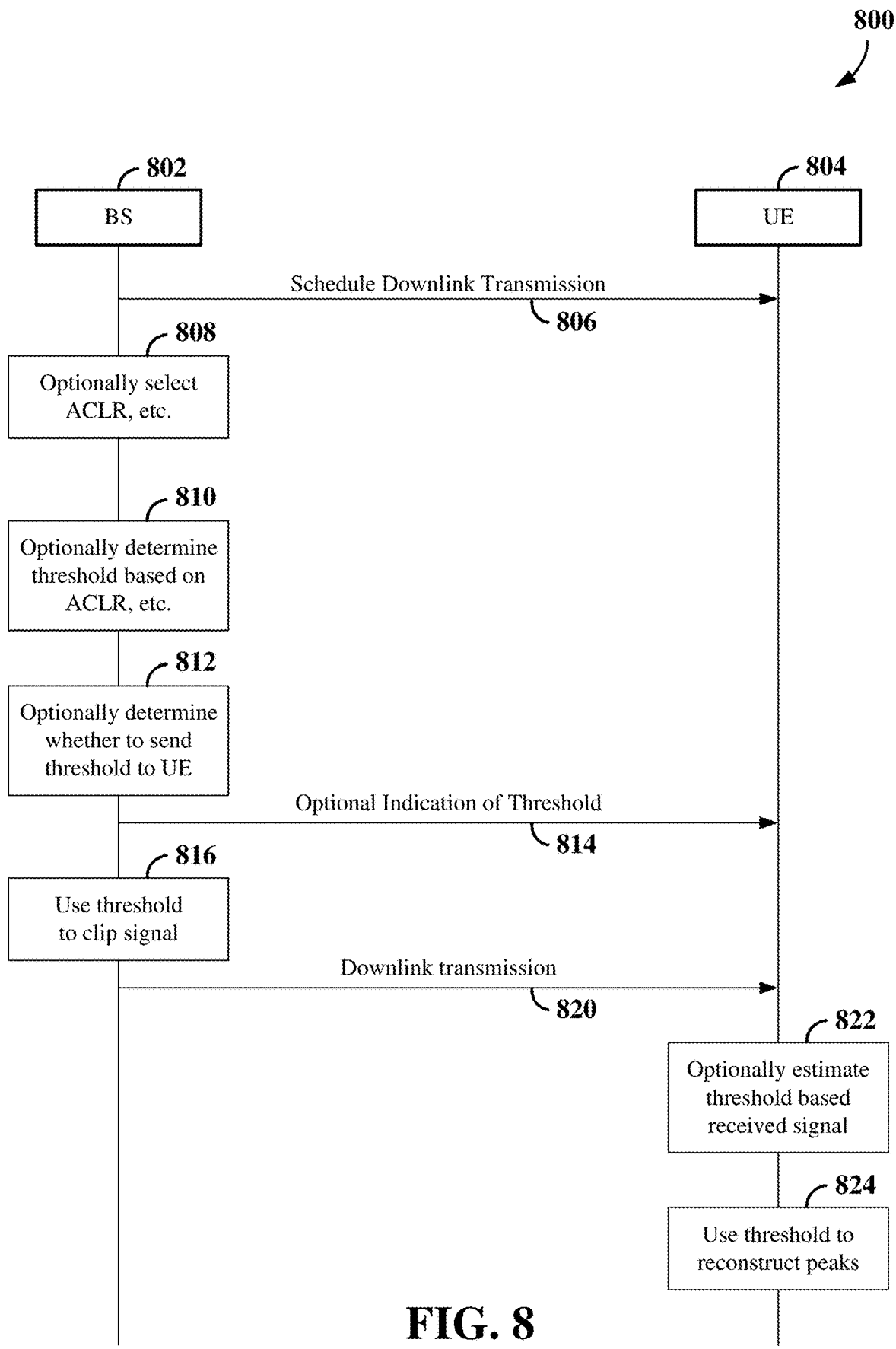
FIG. 8 is a signaling diagram illustrating an example of threshold-related signaling for a downlink transmission according to some aspects.

FIG. 8 is a signaling diagram 800 illustrating an example of threshold-related signaling in a wireless communication system including a base station (BS) 802 and a UE 804. In some examples, the BS 802 may correspond to any of the base stations or scheduling entities shown in any of FIGS. 1 and 2. In some examples, the UE 804 may correspond to any of the UEs or scheduled entities shown in any of FIGS. 1, 2, and 12.

At 806 of FIG. 8, the BS 802 schedules a downlink transmission to the UE 804.

At optional 808, the BS 802 may select an ACLR limit or other requirement(s) if dynamic requirements are allowed (e.g., allowed by a communication standard). In some examples, this selection may be based on a mode of operation as defined in Table 3.

At optional 810, the BS 802 may determine its clipping threshold based on the ACLR limit or other requirement(s). For example, the BS 802 may restrict its clipping threshold based on an ACLR requirement, an EVM requirement, a PAPR requirement, some other requirement(s), or a combination thereof.

At optional 812, the BS 802 may determine whether to send an indication of its clipping threshold to the UE 804 (e.g., based on the current SNR conditions between the UE 804 and the BS 802 or based on a mode of operation as defined in Table 3). Thus, at optional 814, the BS 802 may send an indication of the clipping threshold to the UE 804.

At 816, the BS 802 uses its clipping threshold to clip a data signal to be transmitted to the UE 804. At 820, the BS 802 transmits the clipped data signal to the UE 804.

At optional 822, the UE 804 may estimate the clipping threshold used by the UE 804 based on the received clipped data signal.

At 824, the UE 804 uses a threshold (e.g., the threshold received at 814 or estimated at 822) to reconstruct the peaks of the received clipped data signal.

Figure 9:
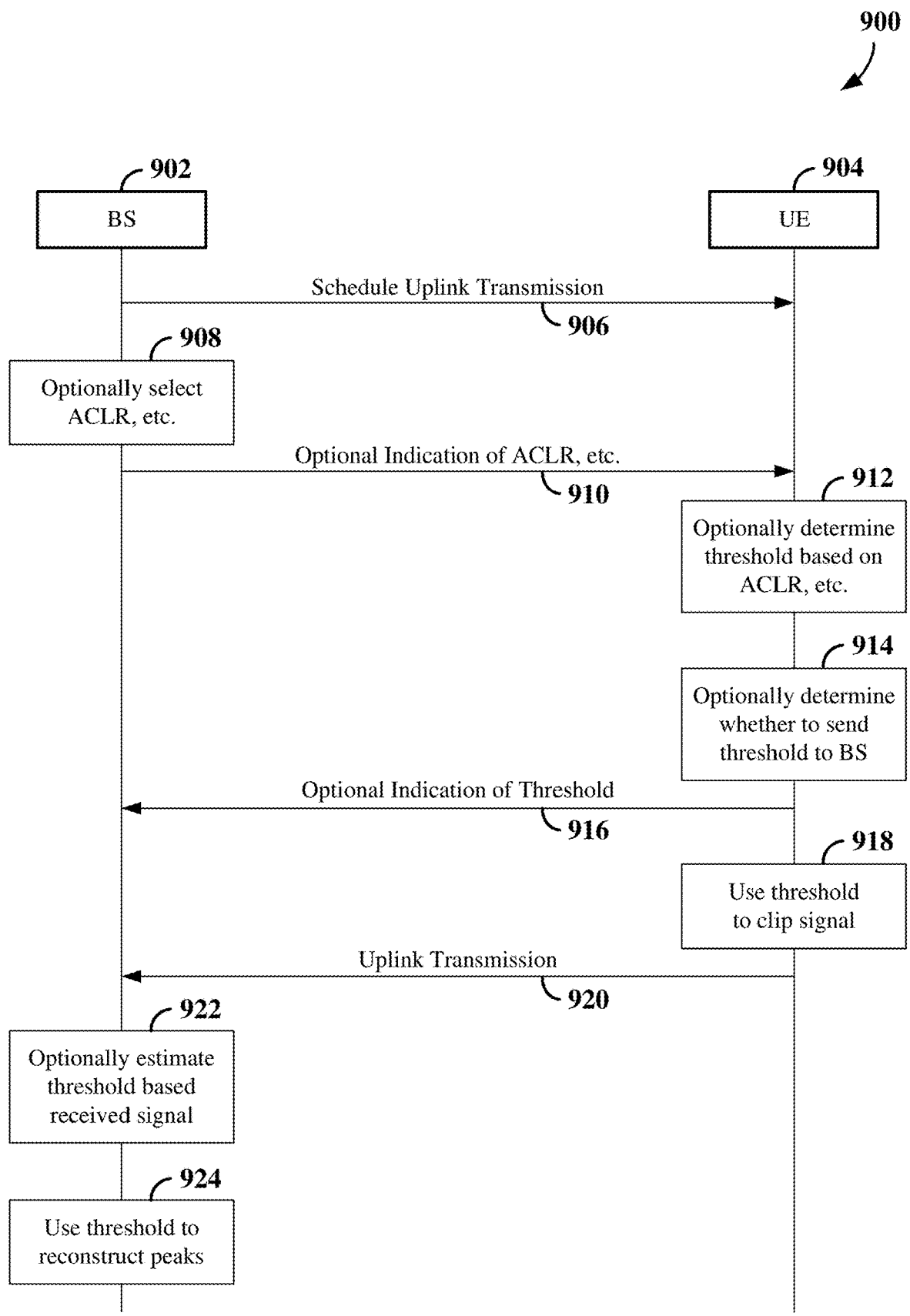
FIG. 9 is a signaling diagram illustrating an example of threshold-related signaling for an uplink transmission according to some aspects.

FIG. 9 is a signaling diagram 900 illustrating an example of threshold-related signaling in a wireless communication system including a base station (BS) 902 and a UE 904. In some examples, the BS 902 may correspond to any of the base stations or scheduling entities shown in any of FIGS. 1, 2, and 8. In some examples, the UE 904 may correspond to any of the UEs or scheduled entities shown in any of FIGS. 1, 2, 8, and 12.

At 906 of FIG. 9, the BS 902 schedules an uplink transmission by the UE 904.

At optional 908, the BS 902 may select an ACLR limit or other requirement(s) if dynamic requirements are allowed (e.g., allowed by a communication standard). In some examples, this selection may be based on a mode of operation as defined in Table 3. At optional 910, the BS 902 may send an indication of the ACLR limit or other requirement(s) to the UE 904.

At optional 912, the UE 904 may determine its clipping threshold based on the ACLR limit or other requirement(s). For example, the UE 904 may restrict its clipping threshold based on an ACLR requirement, an EVM requirement, a PAPR requirement, some other requirement(s), or a combination thereof.

At optional 914, the UE 904 may determine whether to send an indication of its clipping threshold to the BS 902 (e.g., based on the current SNR conditions between the UE 904 and the BS 902 or based on a mode of operation as defined in Table 3). Thus, at optional 916, the UE 904 may send an indication of the clipping threshold to the BS 902.

At 918, the UE 904 uses its clipping threshold to clip a data signal to be transmitted to the BS 902. At 920, the UE 904 transmits the clipped data signal to the BS 902.

At optional 922, the BS 902 may estimate the clipping threshold used by the UE 904 based on the received clipped data signal.

At 924, the BS 902 uses a threshold (e.g., the threshold received at 916 or estimated at 922) to reconstruct the peaks of the received clipped data signal.

In some cases, the peak reconstruction procedure may be configured and/or performed based on a capability of each of the transmitting device and the receiving device. For example, the transmitting device may transmit capability information to the receiving device indicating that the transmitting device has the capability to provide a threshold or other information (e.g., a dynamic ACLR). Based on the capability of the transmitting device, the receiving device may transmit its own capability information to the transmitting device. For example, the receiving device may transmit capability information to the transmitting device indicating whether the receiving device has the capability to use the threshold or other information and/or whether the receiving device has a capability to perform the decision-directed peak reconstruction process described herein. Based on the capability information received from the receiving device, for example, the transmitting device may configure the peak reconstruction procedure accordingly (e.g., to use a configured or derived threshold).

In view of the above, a transmitting device may adjust (e.g., clip) any number of peaks of a data signal to reduce its PAPR. Moreover, a receiving device may reconstruct all or substantially all of the peaks that were reduced to recover and process the information from the originally transmitted data signal while maintaining the relatively improved throughput for such data signal communications. In some examples, the use of a Bussgang decomposition-based peak reconstruction procedure may provide better performance (e.g., a 3 dB reduction in MSE or a 2 dB gain in maximum throughput) as compared to other decision-directed techniques.

Figure 10:
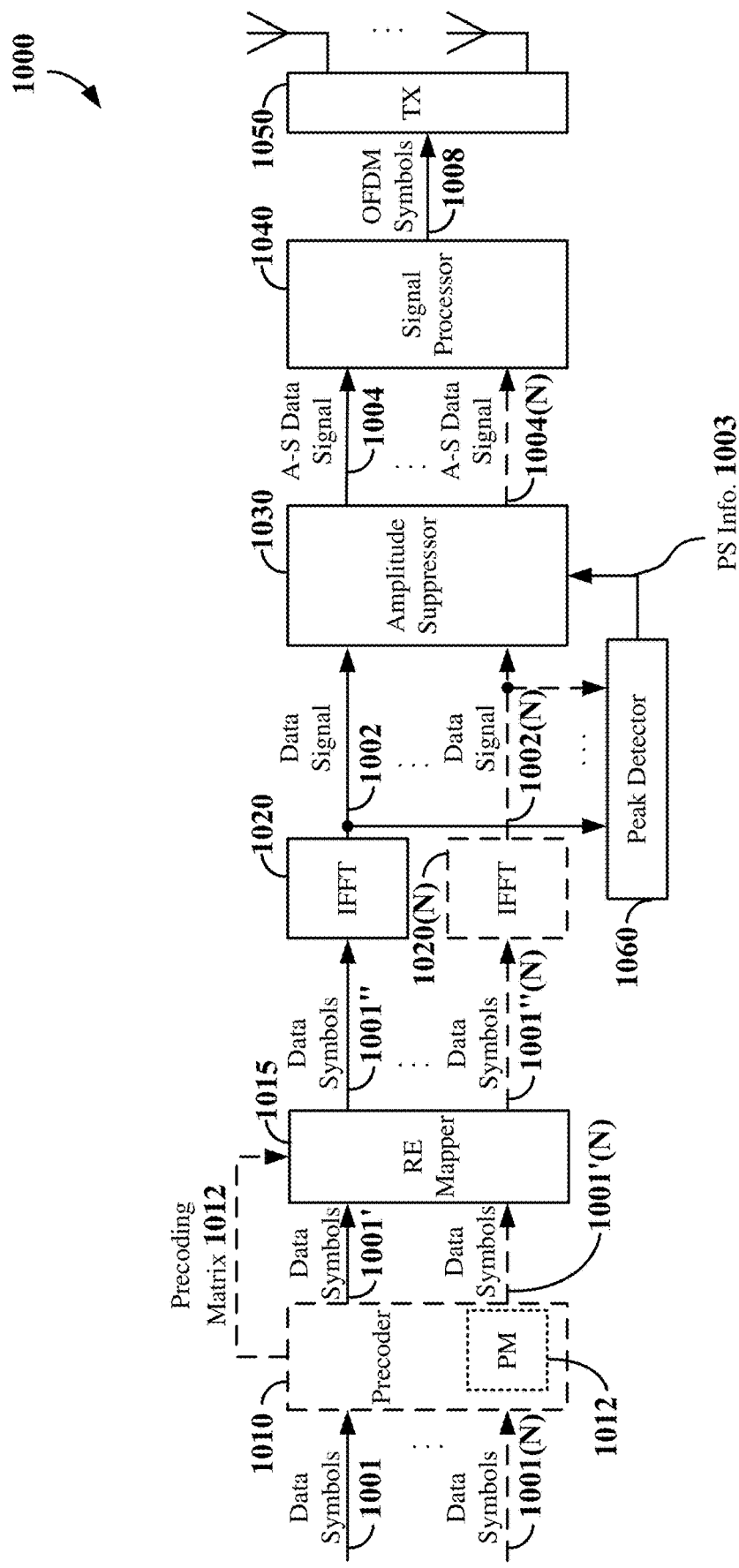
FIG. 10 is a schematic illustration of an example of a transmit chain according to some aspects.
Figure 11:
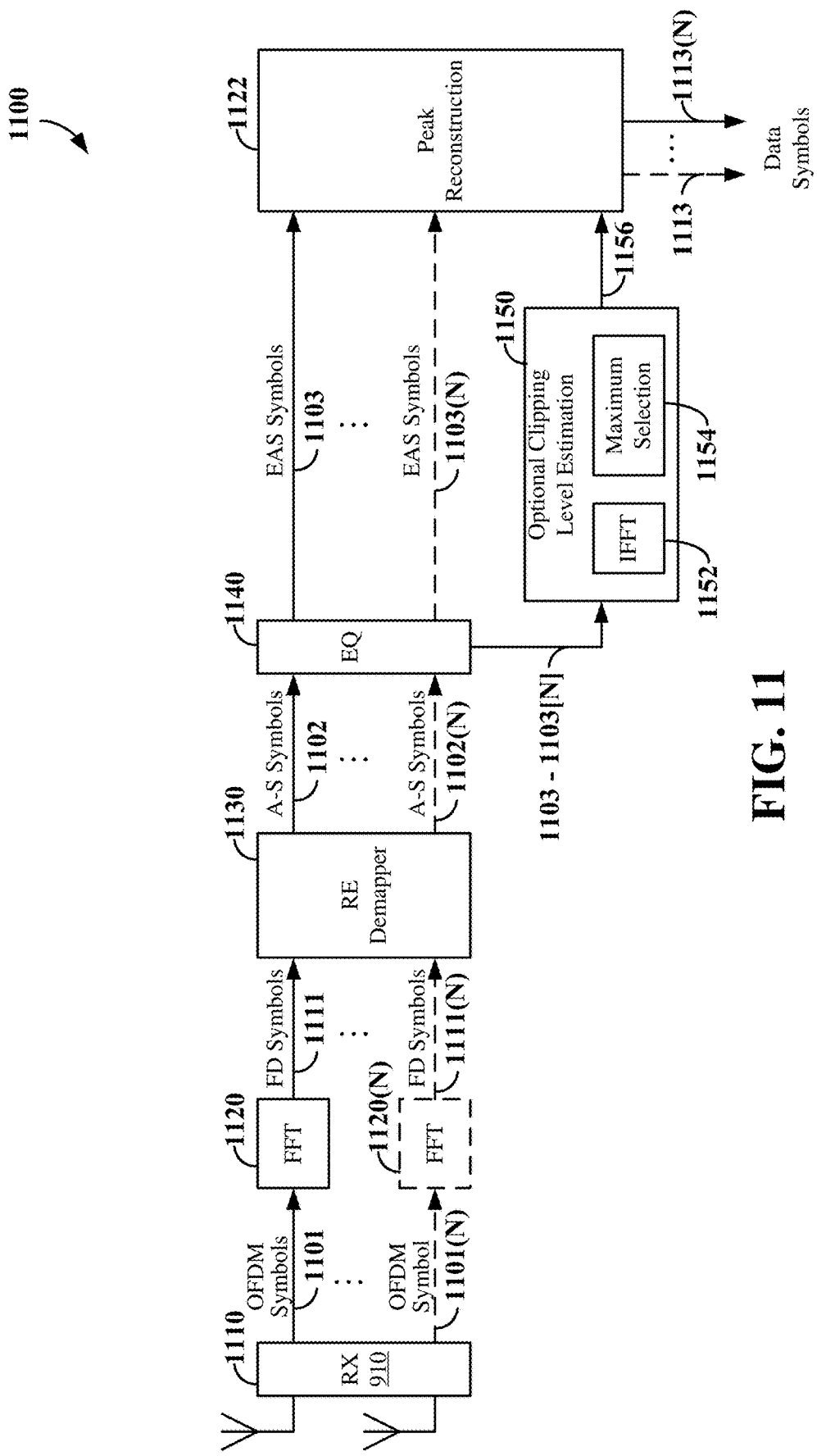
FIG. 11 is a schematic illustration of an example of a receive chain according to some aspects.

With the above in mind, FIGS. 10 and 11 illustrated a more detailed example of the transmit chain 500 and the receive chain 700, respectively, discussed above.

FIG. 10 shows an example transmit (TX) chain 1000 of a wireless communication device that supports PAPR reduction using peak reconstruction in accordance with aspects of the present disclosure. In some examples, the TX chain 1000 may correspond to the transmit chain 500 of FIG. 5. In some examples, the wireless communication device may be a base station such as any of the base stations or scheduling entities of FIG. 1 and FIG. 2. In some examples, the wireless communication device may be a UE such as any of the UEs or scheduled entities of FIG. 1 and FIG. 2. As shown in FIG. 10, solid lines depict data paths used for MIMO and non-MIMO implementations of the TX chain 1000 and dotted (or phantom) lines depict additional data paths used for MIMO implementations of the TX chain 1000.

The TX chain 1000 includes a resource element (RE) mapper 1015, an IFFT 1020, an amplitude suppressor 1030, a signal processor 1040, and a transmitter 1050. For non-MIMO implementations, the TX chain 1000 may obtain data symbols 1001 to be transmitted to a receiving device. The data symbols 1001 may be modulated using various digital modulation techniques. Example modulation techniques include, but are not limited to, phase-shift keying (PSK) and QAM. Thus, each of the data symbols 1001 may correspond to a point on a constellation graph (e.g., constellation plot) of the in-phase (I) and quadrature (Q) components of the modulated subcarriers. Each constellation point can be represented by a modulated amplitude and phase.

In some examples, RE mapper 1015 maps the data symbols 1001 to data symbols 1001" of one or more resource blocks. The IFFT 1020 converts the data symbols 1001" from the frequency domain to the time domain. For example, the IFFT 1020 may produce a sequence of time-varying samples representative of the data symbols 1001". In some aspects, the data symbols 1001" may be parallelized (by a serial-to-parallel converter, not shown) at the input of the IFFT 1020, and the resulting samples may be serialized (by a parallel-to-serial converter, not shown) at the output of the IFFT 1020. The sequence of samples output by the IFFT 1020 represents a time domain data signal 1002. In some instances, the data signal 1002 may include one or more samples (or peaks) having amplitudes that are substantially higher than the average amplitude of the remaining samples.

In some examples, the peak detector 1060 may use the clipping threshold to identify peaks that have amplitudes exceeding an amplitude threshold. In some cases, the peak detector 1060 may determine the clipping threshold based on a capability of the receiving device.

The peak detector 1060 may detect one or more peaks in the data signal 1002 and generate peak suppression information 1003 describing or identifying the detected peaks. With reference for example to FIG. 6A, the peak suppression information 1003 may include the positions ($s_n$), amplitudes ($A_n$), and phases (not shown) of the peaks 602. The peak detector 1060 may provide the peak suppression information 1003 to the amplitude suppressor 1030.

The amplitude suppressor 1030 may adjust the data signal 1002 by reducing or suppressing the amplitudes of the samples associated with the peaks. For example, the amplitude suppressor 1030 may generate an amplitude-suppressed (A-S) data signal 1004 by replacing or substituting each of the peak amplitudes in the data signal 1002 with a suppressed amplitude. In some implementations, the suppressed amplitude may be a known or preconfigured amplitude value that is less than or equal to a corresponding amplitude threshold.

As discussed above, chopping (or reducing) the peaks of a data signal may degrade EVM at the transmitter. For example, the EVM of the A-S data signal 1004 may be worse than the EVM of the original data signal 1002. In some examples, the peak detector 1060 may pass information to the transmitter 1050 indicating the clipping threshold so that an indication of the clipping threshold may be transmitted to the receiving device (e.g., via a PDCCH, PDSCH, or other type of signaling). Based on the indication of the clipping threshold, the receiving device may configure the amplitude threshold to use for reconstructing peaks that may exceed the threshold as discussed herein.

The signal processor 1040 may process the A-S data signal 1004 to provide one or more OFDM symbols 1008. The OFDM symbols 1008 are provided to the transmitter 1050 for transmission, over a wireless channel, to a receiving device. The transmitter 1050 may include one or more power amplifiers (not shown) to amplify the OFDM symbols 1008 transmitted via one or more TX antennas. As described above, the operating range of the power amplifier may depend on the PAPR of the OFDM symbols 1008. Because the A-S data signal 1004 has a significantly lower PAPR than the original data signal 1002, aspects of the present disclosure may improve the efficiency of the power amplifier while reducing the power consumption of the transmitting device.

MIMO implementations of the TX chain 1000 may additionally include a precoder 1010 and number (N) of IFFTs 1020. The precoder 1010 may apply a precoding matrix (PM) 1012 to N parallel streams of data symbols 1001-1001(N) to produce N pre-coded data symbols 1001'-1001'(N) that are provided to the RE mapper 1015. The N pre-coded data symbols 1001'-1001'(N) are weighted based on the precoding matrix 1012 for optimal MIMO transmissions given the channel conditions of the wireless channel. In some implementations, the transmitting device may provide an indication of the precoding matrix 1012 to the receiving device for purposes of reconstructing the data symbols 1001. In some implementations, the indication may be transmitted in DCI messages on a per-slot basis. In some other implementations, the indication may be periodically transmitted in MAC control elements (CEs) after a given number (M) of slots.

In some implementations, the transmitting device may transmit a CSI-RS to the receiving device. The receiving device may estimate the channel conditions of the wireless channel based on the CSI-RS and report a precoding matrix indicator (PMI) back to the transmitting device indicating a recommended precoding matrix to be used given the channel conditions of the wireless channel. In some aspects, the transmitting device may use the precoding matrix recommended by the receiving device. Accordingly, the transmitting device may indicate, in the PDCCH, that the precoding matrix 1012 is the same as (or matches) the recommended precoding matrix indicated by the PMI.

For MIMO implementations, the TX chain 1000 may perform substantially the same operations as the non-MIMO implementations of the TX chain 1000 on multiple concurrent or parallel streams of N data symbols 1001-1001(N). For example, the N IFFTs 1020 may simultaneously convert N streams of data symbols 1001"-1001" (N) from the RE mapper 1015 to N data signals 1002-1002(N), respectively. The amplitude suppressor 1030 may adjust the N data signals 1002-1002(N) to generate N amplitude-suppressed (A-S) data signals 1004-1004(N). In addition, the signal processor 1040 may process the N A-S data signals 1004-1004(N) to provide one or more OFDM symbols 1008, and the transmitter 1050 may transmit the OFDM symbols 1008 concurrently via multiple TX antennas.

FIG. 11 shows an example receive (RX) chain 1100 of a wireless communications device that supports PAPR reduction using peak reconstruction in accordance with aspects of the present disclosure. In some examples, the RX chain 1100 may correspond to the receive chain 700 of FIG. 7. In some examples, the wireless communication device may be a base station such as any of the base stations or scheduling entities of FIG. 1 and FIG. 2. In some examples, the wireless communication device may be a UE such as any of the UEs or scheduled entities of FIG. 1 and FIG. 2. As shown in FIG. 11, solid lines depict data paths used for MIMO and non-MIMO implementations of the RX chain 1100 and dotted (or phantom) lines depict additional data paths used only for MIMO implementations of the RX chain 1100.

The RX chain 1100 includes a receiver 1110, an FFT circuit 1120, a resource element (RE) demapper 1130, an equalizer (or, "EQ") 1140, and a peak reconstruction circuit 1122. For non-MIMO implementations, the RX chain 1100 may receive OFDM symbols 1101 from a transmitting device. The OFDM symbols 1101 may be received via one or more antennas of the receiver 1110 and amplified by a low-noise amplifier (LNA), for example, within the receiver 1110. In some cases, the LNA may additionally or alternatively be implemented as a separate component connected with the receiver 1110. In some implementations, the OFDM symbols 1101 may include an amplitude-suppressed data signal (e.g., the A-S data signal 1004 described with reference to FIG. 10). As described with respect to FIG. 10, the amplitude-suppressed data signal may be a data signal having chopped (or clipped, truncated, etc.) peaks. For example, the amplitudes of samples associated with the peaks may be reduced (at the transmitting device) below a threshold amplitude level.

The FFT circuit 1120 may convert the OFDM symbols 1101 from the time domain to the frequency domain. For example, the FFT circuit 1120 may produce a sequence of frequency domain symbols 1111 representative of the amplitude-suppressed data signal included in the received OFDM symbols 1101. Thus, the resulting frequency domain symbols 1111 may include A-S symbols 1102 corresponding to the amplitude-suppressed data signal in the OFDM symbols 1101. In some examples, the OFDM symbols 1101 may be parallelized (by a serial-to-parallel converter, not shown) at the input of the FFT circuit 1120, and the resulting frequency domain symbols 1111 may be serialized (by a parallel-to-serial converter, not shown) at the output of the FFT circuit 1120. The RE demapper 1130 may be configured to parse (or, e.g., demap) the A-S symbols 1102 from the frequency domain symbols 1111. The equalizer 1140 may perform equalization on the A-S symbols 1102 to provide equalized A-S (EAS) symbols 1103. In some aspects, the EAS symbols 1103 may have a relatively poor (e.g., relatively high) EVM as a result of the peak suppression performed at the transmitting device.

In some examples, the RX chain 1100 includes a clipping level estimation circuit 1150 that estimates the clipping threshold used by the transmitting device. In some examples, the clipping level estimation circuit 1150 estimates this clipping threshold based on equalized A-S (EAS) symbols 1103 received from the equalizer 1140. An IFFT circuit 1152 may convert the EAS symbols 1103 to a time domain signal. A maximum selection circuit 1154 may then determine at least one maximum amplitude of the time domain signal and generate an estimated clipping threshold 1156 that is provided to the peak reconstruction circuit 1122 based on the at least one maximum amplitude. In some examples, the estimated clipping threshold 1156 is set equal to the determined maximum amplitude. In some examples, the estimated clipping threshold 1156 is calculated as a function of the maximum amplitude (e.g., an average of the maximum amplitude over time). In some examples, the estimated clipping threshold 1156 is calculated based on a histogram of maximum amplitudes determined over a period of time.

In some examples, the OFDM symbols 1101 received via the receiver 1110 may include information indicating a clipping threshold (e.g., via a PDCCH, PDSCH, or other type of signaling). The information indicating the clipping threshold may be passed to the RE demapper 1130 (e.g., via the FFT circuit 1120), for example, via control information (e.g., via a PDCCH, in DCI, in a MAC CE, etc.), and the RE demapper 1130 may pass the indication of the clipping threshold on to the peak reconstruction circuit 1122 (e.g., via data symbols from the equalizer 1140).

The peak reconstruction circuit 1122 reconstructs the original data symbols (e.g., the data symbols 1001' of FIG. 10) from the EAS symbols 1103 based on the estimated threshold 1156 or the indication of the threshold received from the transmitting device. In some examples, the peak reconstruction circuit 1122 uses a Bussgang decomposition algorithm as discussed above in conjunction with Table 1. The peak reconstruction circuit 1122 may then pass the substantially reconstructed data symbols 1113 to a modem (not shown), for example, to demodulate and decode information included in the reconstructed data symbols.

In some implementations, the determination of the clipping threshold may be part of the Bussgang decomposition algorithm. For example, the algorithm may use hypotheses of the clipping threshold in the clipping operations of Table 1, whereby the clipping threshold value may converge to an optimum level along with the other converging values of the algorithm.

For MIMO implementations, the RX chain 1100 may perform substantially the same operations as the non-MIMO implementations of the RX chain 1100 on multiple concurrent or parallel streams of OFDM symbols 1101. For example, the N FFT circuits 1120 may simultaneously convert N streams of OFDM symbols 1101-1101(N) to N streams of frequency domain symbols 1111-1111(N). The RE demapper 1130 may be configured to parse (or, e.g., demap) N A-S symbols 1102-1102(N) from the N frequency domain symbols 1111-1111(N). The equalizer 1140 may perform equalization on the N A-S symbols 1102-1102(N) to provide N equalized A-S (EAS) symbols 1103-1103(N).

MIMO implementations of the RX chain 1100 may additionally include an inverse precoder (not shown). The inverse precoder reverses the precoding performed by the precoder 1010 of FIG. 10. For example, the inverse precoder may apply an inverse of the precoding matrix 1012 (described with reference to FIG. 10) to the data symbols 1113-1113(N). In some examples, the inverse precoder may receive an indication of a precoding matrix (e.g., the precoding matrix 1012, as described with reference to FIG. 10) from the transmitting device. For example, the indication may be included in DCI messages received on a per-slot basis. As another example, the indication may be included in MAC CEs received periodically after a given number (M) of slots. As a further example, the indication may be based on a PMI received from the transmitting device.

Figure 12:
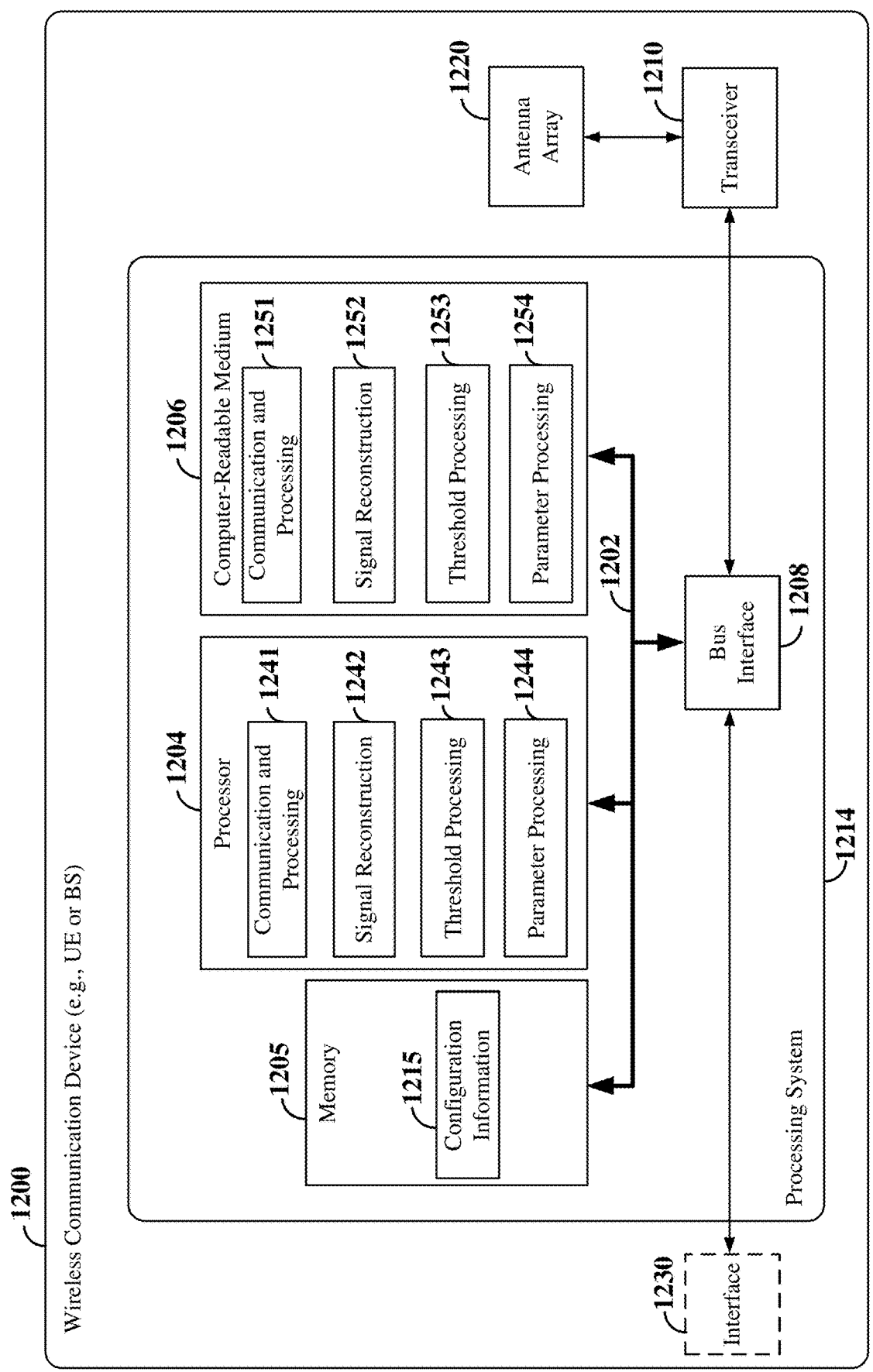
FIG. 12 is a block diagram illustrating an example of a hardware implementation for a wireless communication device (e.g., a user equipment or a base station) employing a processing system according to some aspects.

FIG. 12 is a block diagram illustrating an example of a hardware implementation for a wireless communication device 1200 employing a processing system 1214. In some examples, the wireless communication device 1200 may be a UE or scheduled entity configured to wirelessly communicate with a base station or scheduling entity, as discussed in any one or more of FIGS. 1-11. In this case, the wireless communication device 1200 may correspond to any of the UEs or scheduled entities shown in any of FIGS. 1 and 2. In some examples, the wireless communication device 1200 may be a base station or scheduling entity configured to wirelessly communicate with a UE or scheduled entity, as discussed in any one or more of FIGS. 1-11. In this case, the wireless communication device 1200 may correspond to any of the base stations or scheduling entities shown in any of FIGS. 1 and 2.

In accordance with various aspects of the disclosure, an element, or any portion of an element, or any combination of elements may be implemented with the processing system 1214. The processing system 1214 may include one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1200 may be configured to perform any one or more of the functions described herein. That is, the processor 1204, as utilized in a wireless communication device 1200, may be used to implement any one or more of the processes and procedures described herein.

The processor 1204 may in some instances be implemented via a baseband or modem chip and in other implementations, the processor 1204 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210 and an antenna array 1220 and between the bus 1202 and an interface 1230. The transceiver 1210 provides a communication interface or means for communicating with various other apparatus over a wireless transmission medium. The interface 1230 provides a communication interface or means of communicating with various other apparatuses and devices (e.g., other devices housed within the same apparatus as the wireless communication device 1200 or other external apparatuses) over an internal bus or external transmission medium, such as an Ethernet cable. Depending upon the nature of the apparatus, the interface 1230 may include a user interface (e.g., keypad, display, speaker, microphone, joystick). Of course, such a user interface is optional, and may be omitted in some examples, such as a base station.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software. For example, the memory 1205 may store configuration information 1215 (e.g., parameters associated with peak reconstruction as discussed herein) used by the processor 1204 in cooperation with the transceiver 1210 to transmit uplink control information.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The wireless communication device 1200 may be configured to perform any one or more of the operations described herein (e.g., as described above in conjunction with FIGS. 1-11 and as described below in conjunction with FIGS. 13-15). In some aspects of the disclosure, the processor 1204, as utilized in the wireless communication device 1200, may include circuitry configured for various functions.

The processor 1204 may include communication and processing circuitry 1241. In examples where the wireless communication device 1200 is a scheduled entity (e.g., a UE), the communication and processing circuitry 1241 may be configured to communicate with a scheduling entity such as a base station. In examples where the wireless communication device 1200 is a scheduling entity (e.g., a base station), the communication and processing circuitry 1241 may be configured to communicate with a scheduled entity such as a UE. The communication and processing circuitry 1241 may include one or more hardware components that provide the physical structure that performs various processes related to wireless communication (e.g., signal reception and/or signal transmission) as described herein. The communication and processing circuitry 1241 may further include one or more hardware components that provide the physical structure that performs various processes related to signal processing (e.g., processing a received signal and/or processing a signal for transmission) as described herein. In some examples, the communication and processing circuitry 1241 may include two or more transmit/receive chains, each configured to process signals in a different RAT (or RAN) type. The communication and processing circuitry 1241 may further be configured to execute communication and processing software 1251 included on the computer-readable medium 1206 to implement one or more functions described herein.

In some implementations where the communication involves receiving information, the communication and processing circuitry 1241 may obtain information from a component of the wireless communication device 1200 (e.g., from the transceiver 1210 that receives the information via radio frequency signaling or some other type of signaling suitable for the applicable communication medium), process (e.g., decode) the information, and output the processed information. For example, the communication and processing circuitry 1241 may output the information to another component of the processor 1204, to the memory 1205, or to the bus interface 1208. In some examples, the communication and processing circuitry 1241 may receive one or more of signals, messages, other information, or any combination thereof. In some examples, the communication and processing circuitry 1241 may receive information via one or more channels. In some examples, the communication and processing circuitry 1241 may include functionality for a means for receiving. For example, the communication and processing circuitry 1241 may include functionality of the receiver 1110 of FIG. 11. In some examples, the communication and processing circuitry 1241 may include functionality for a means for decoding.

In some implementations where the communication involves sending (e.g., transmitting) information, the communication and processing circuitry 1241 may obtain information (e.g., from another component of the processor 1204, the memory 1205, or the bus interface 1208), process (e.g., encode) the information, and output the processed information. For example, the communication and processing circuitry 1241 may output the information to the transceiver 1210 (e.g., that transmits the information via radio frequency signaling or some other type of signaling suitable for the applicable communication medium). In some examples, the communication and processing circuitry 1241 may send one or more of signals, messages, other information, or any combination thereof. In some examples, the communication and processing circuitry 1241 may send information via one or more channels. In some examples, the communication and processing circuitry 1241 may include functionality for a means for sending (e.g., a means for transmitting). For example, the communication and processing circuitry 1241 may include functionality of the transmitter 1050 of FIG. 10. In some examples, the communication and processing circuitry 1241 may include functionality for a means for encoding.

In some examples, the communication and processing circuitry 1241 may provide a means to receive a non-linearly distorted data signal. For example, the communication and processing circuitry 1241 together with the transceiver 1210 may be configured to receive the clipped data signal 702 of FIG. 7 (e.g., to receive y(x) of Table 1) from a transmitting device via a scheduled resource (e.g., PDSCH or PUSCH).

In some examples, the communication and processing circuitry 1241 may provide a means to transmit at least one parameter to the second wireless communication device. For example, the communication and processing circuitry 1241 together with the transceiver 1210 may be configured to transmit an indication of a clipping threshold (e.g., the clipping threshold 520 of FIG. 5) or some other information to a receiving device via a scheduled resource (e.g., PDSCH or PUSCH).

In some examples, the communication and processing circuitry 1241 may provide a means to transmit a non-linearly distorted data signal. For example, the communication and processing circuitry 1241 together with the transceiver 1210 may be configured to transmit the clipped data signal 518 of FIG. 5 to a receiving device via a scheduled resource (e.g., PDSCH or PUSCH).

The processor 1204 may include signal reconstruction circuitry 1242 configured to perform signal reconstruction-related operations as discussed herein (e.g., one or more of the peak reconstruction-related operations described in conjunction with FIGS. 5-11). The signal reconstruction circuitry 1242 may be configured to execute signal reconstruction software 1252 included on the computer-readable medium 1206 to implement one or more functions described herein.

In some examples, the signal reconstruction circuitry 1242 may provide a means to scale a data signal to provide a scaled signal. For example, the signal reconstruction circuitry 1242 may be configured to divide $y_{corrected}$ by a Bussgang coefficient (a) as described in Table 1. As another example, the signal reconstruction circuitry 1242, shown and described above in connection with FIG. 12, may be configured to multiply a sliced signal by a Bussgang coefficient (a) as described in Table 1.

In some examples, the signal reconstruction circuitry 1242 may include functionality for a means for slicing. For example, the signal reconstruction circuitry 1242 may include the functionality of the peak reconstruction circuit 712 of FIG. 7 and/or the functionality of the peak reconstruction circuit 1122 of FIG. 11 relating to performing the Decision operation of Table 1. In some examples, the signal reconstruction circuitry 1242 may be configured to determine a distance vector between an estimate of a received signal and the expected constellation points for that signal.

In some examples, the signal reconstruction circuitry 1242 may include functionality for a means for applying a non-linear function to a signal. For example, the signal reconstruction circuitry 1242 may include the functionality of the peak reconstruction circuit 712 of FIG. 7 and/or the functionality of the peak reconstruction circuit 1122 of FIG. 11 relating to performing the Estimation operation of Table 1. In some examples, the signal reconstruction circuitry 1242 may be configured to modify a sliced signal to remove any peaks above a threshold level. In some examples, the signal reconstruction circuitry 1242 may be configured to perform the clipping operation of the Estimation phase of Table 1.

In some examples, the signal reconstruction circuitry 1242 may include functionality for a means for generating a non-linear distortion estimate. For example, the signal reconstruction circuitry 1242 may include the functionality of the peak reconstruction circuit 712 of FIG. 7 and/or the functionality of the peak reconstruction circuit 1122 of FIG. 11 relating to performing the Estimation operation of Table 1. In some examples, the signal reconstruction circuitry 1242 may be configured to perform the Estimation phase of Table 1. In some examples, the signal reconstruction circuitry 1242 may be configured to iteratively execute the procedure of Table 1 to determine $\hat{d}$.

In some examples, the signal reconstruction circuitry 1242 may include functionality for a means for generating a signal estimate. For example, the signal reconstruction circuitry 1242 may include the functionality of the peak reconstruction circuit 712 of FIG. 7 and/or the functionality of the peak reconstruction circuit 1122 of FIG. 11 relating to performing the Correction operation of Table 1. In some examples, the signal reconstruction circuitry 1242 may be configured to iteratively execute the procedure of Table 1 to determine $y_{corrected}$.

In some examples, the signal reconstruction circuitry 1242 may provide a means to generate a non-linearly distorted data signal. For example, the signal reconstruction circuitry 1242 may include the functionality of the peak detection and suppression circuit 516 of FIG. 5 and/or the functionality of the amplitude suppressor 1030 of FIG. 10 relating to clipping a data signal to remove peak amplitudes that are greater than a threshold level.

The processor 1204 may include threshold processing circuitry 1243 configured to perform threshold processing-related operations as discussed herein (e.g., one or more of the threshold-related operations described in conjunction with FIGS. 5-12). The threshold processing circuitry 1243 may be configured to execute threshold processing software 1253 included on the computer-readable medium 1206 to implement one or more functions described herein.

In some examples, the threshold processing circuitry 1243 may include functionality for a means for estimating a clipping threshold. For example, the threshold processing circuitry 1243 may include the functionality of the clipping estimation circuit 718 of FIG. 7 and/or the functionality of the clipping level estimation circuit 1150 of FIG. 11.

In some examples, the threshold processing circuitry 1243 may include functionality for a means for generating a clipped data signal. For example, the threshold processing circuitry 1243 may include the functionality of the peak detection and suppression circuit 516 of FIG. 5 and/or the functionality of the peak detector 1060 and the amplitude suppressor 1030 of FIG. 10.

In some examples, the threshold processing circuitry 1243 may provide a means to generate a non-linearly distorted data signal. For example, the threshold processing circuitry 1243 may be configured to clip a data signal to remove peak amplitudes that are greater than a threshold level.

In some examples, the threshold processing circuitry 1243 may provide a means to determine a parameter for a non-linear distortion function. For example, the threshold processing circuitry 1243 may be configured to determine a clipping threshold based on an ACLR limit.

The processor 1204 may include parameter processing circuitry 1244 configured to perform parameter processing-related operations as discussed herein (e.g., one or more of the parameter processing operations described in conjunction with FIGS. 5-12). The parameter processing circuitry 1244 may further be configured to execute parameter processing software 1254 included on the computer-readable medium 1206 to implement one or more functions described herein.

In some examples, the parameter processing circuitry 1244 may include functionality for a means for determining to provide a parameter. For example, the parameter processing circuitry 1244 may include the functionality described at 812 of FIGS. 8 and/or 908 of FIGS. 9 and/or 914 of FIG. 9. In some examples, the parameter processing circuitry 1244 may be configured to determine whether an SNR associated with a channel to a receiving device is greater than or less than a threshold and, based on that determination, determine whether to send an indication of a clipping threshold to the receiving device. In some examples, the parameter processing circuitry 1244 may be configured to determine whether to send an indication of a clipping threshold to a receiving device based on a mode of operation (e.g., a Minimal Change configuration of Table 3).

In some examples, the parameter processing circuitry 1244 may provide a means to receive information for determining a parameter for a non-linear distortion function. For example, the parameter processing circuitry 1244 together with the communication and processing circuitry 1241 and the transceiver 1210 may be configured to receive an ACLR limit, an EVM parameter, or some other information from a receiving device (e.g., a gNB) via a scheduled resource (e.g., a PDSCH).

Figure 13:
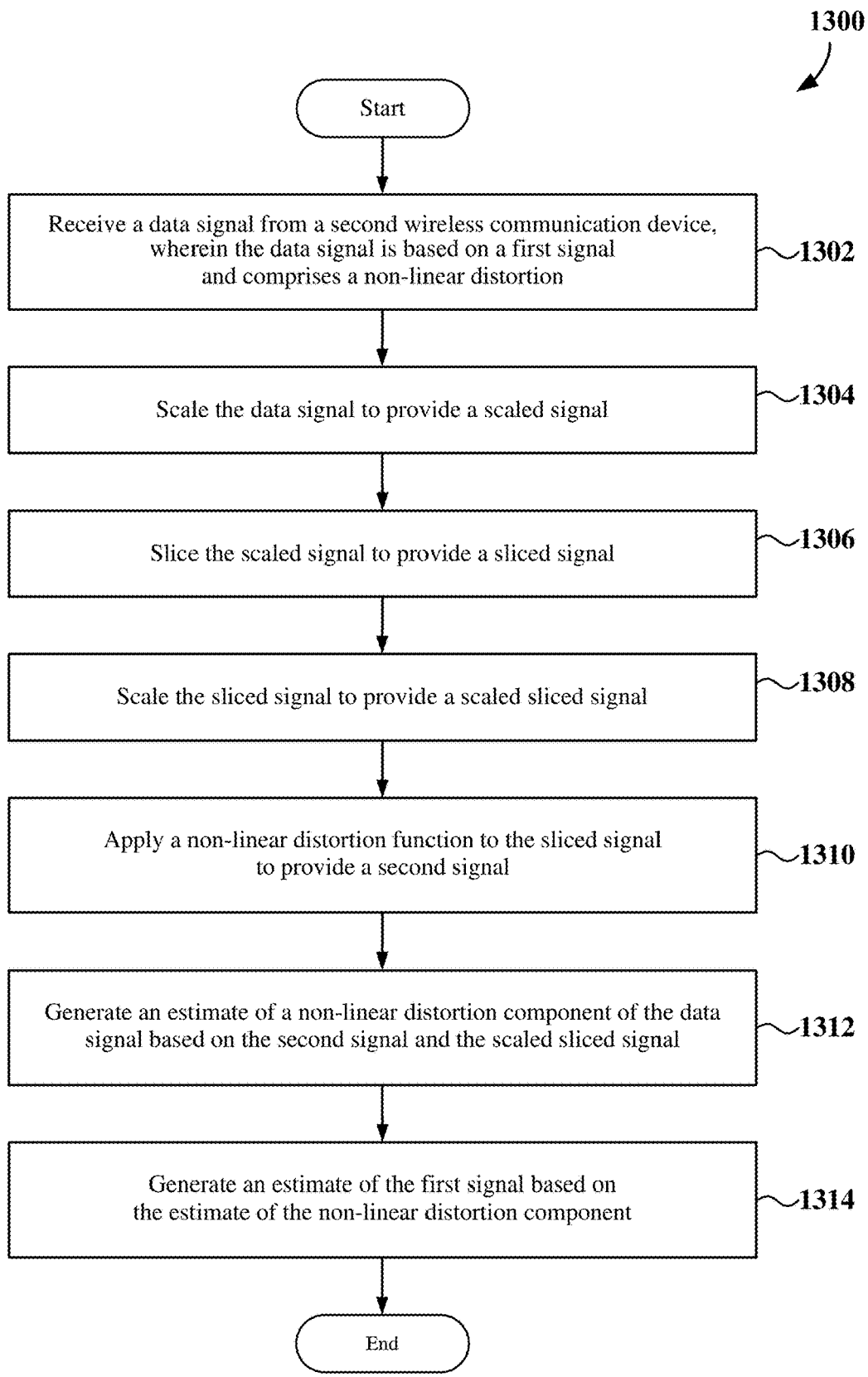
FIG. 13 is a flowchart illustrating an example process for reconstructing a signal according to some aspects.

FIG. 13 is a flow chart illustrating an example method 1300 for wireless communication in accordance with some aspects of the present disclosure. As described below, some or all illustrated features may be omitted in a particular implementation within the scope of the present disclosure, and some illustrated features may not be required for implementation of all examples. In some examples, the method 1300 may be carried out by the wireless communication device 1200 illustrated in FIG. 12. In some examples, the method 1300 may be carried out by any suitable apparatus or means for carrying out the functions or algorithm described below.

At block 1302, a first wireless communication device may receive a data signal from a second wireless communication device, wherein the data signal is based on a first signal (e.g., x of Table 1) and includes a non-linear distortion. For example, the communication and processing circuitry 1241 and the transceiver 1210, shown and described above in connection with FIG. 12, may provide a means to receive a data signal from a second wireless communication device. In some examples, the non-linear distortion may be due to clipping of the first signal.

At block 1304, the first wireless communication device may scale the data signal to provide a scaled signal (e.g., $y_{corrected}/\alpha$ of Table 1). In some examples, the signal reconstruction circuitry 1242, shown and described above in connection with FIG. 12, may provide a means to scale the data signal to provide a scaled signal.

At block 1306, the first wireless communication device may slice the scaled signal to provide a sliced signal (e.g., $\hat{x}$ of Table 1). In some examples, the slicing may be hard slicing. In some examples, the slicing may be soft slicing. In some examples, the slicing may be transparent slicing. In some examples, the signal reconstruction circuitry 1242, shown and described above in connection with FIG. 12, may provide a means to slice the scaled signal to provide a sliced signal.

In some examples, the slicing of the scaled signal by the wireless communication device may include applying a fast Fourier transform to the scaled signal to provide a frequency domain signal (e.g., $\text{fft}(y_{corrected}/\alpha)$ of Table 1), slicing the frequency domain signal to provide a sliced frequency domain signal (e.g., $\text{Slicer}(\text{fft}(y_{corrected}/\alpha))$ of Table 1), and applying an inverse fast Fourier transform to the sliced frequency domain signal to provide a time domain signal (e.g., $\text{ifft}(\text{Slicer}(\text{fft}(y_{corrected}/\alpha)))$ of Table 1).

At block 1308, the first wireless communication device may scale the sliced signal to provide a scaled sliced signal (e.g., $\alpha\hat{x}$ of Table 1). In some examples, the first wireless communication device may use Bussgang scaling that uses a Bussgang coefficient to scale the sliced signal. In some examples, the signal reconstruction circuitry 1242, shown and described above in connection with FIG. 12, may provide a means to scale the sliced signal to provide a scaled sliced signal.

At block 1310, the first wireless communication device may apply a non-linear function to the sliced signal to provide a second signal (e.g., $\text{Clipping}(\hat{x})$). In some examples, the signal reconstruction circuitry 1242 may provide a means to apply a non-linear function to the sliced signal to provide a second signal.

In some examples, the application of the non-linear distortion function to the sliced signal by the first wireless communication device may include clipping the sliced signal. For example, the first wireless communication device may apply a clipping threshold to the sliced signal. In some examples, the first wireless communication device may receive the clipping threshold from the second wireless communication device.

In some examples, the application of the non-linear distortion function to the sliced signal by the first wireless communication device may include applying at least one parameter indicative of the non-linear distortion function to the sliced signal. In some examples, the first wireless communication device may receive the at least one parameter indicative of the non-linear distortion function from the second wireless communication device. In some examples (e.g., according to the Complied option discussed above in conjunction with Table 3), the first wireless communication device may select the at least one parameter indicative of the non-linear distortion function based on a standard-specified adjusted channel leakage ratio (ACLR) or a standard-specified error vector magnitude (EVM).

In some examples, the at least one parameter indicative of the non-linear distortion function is a clipping threshold. In some examples, the first wireless communication device may estimate the clipping threshold from the data signal. For example, the first wireless communication device may estimate the clipping threshold based on a maximum amplitude of the data signal. As another example, the first wireless communication device may apply equalization to the data signal to provide an equalized signal, apply an inverse fast Fourier transform to the equalized signal to provide a time domain signal, measure a maximum amplitude of the time domain signal, and estimate the clipping threshold based on the maximum amplitude. As a further example, the first wireless communication device may estimate the clipping threshold based on an average maximum amplitude of the data signal or based on a histogram of the maximum amplitudes of the data signal.

In some examples (e.g., according to the Relaxed option discussed above in conjunction with Table 3), the first wireless communication device may receive an indication from the second wireless communication device, wherein the indication specifies an adjusted channel leakage ratio (ACLR), an error vector magnitude (EVM), or a peak-to-average power ratio (PAPR). In some examples, the first wireless communication device may select the at least one parameter indicative of the non-linear distortion function based on the ACLR, the EVM, or the PAPR.

In some examples, the first wireless communication device may receive an indication from the second wireless communication device, where the indication specifies a peak-to-average power ratio (PAPR). In some examples, the first wireless communication device may select the at least one parameter indicative of the non-linear distortion function based on the PAPR.

In some examples, the first wireless communication device may determine that use of a dynamic adjusted channel leakage ratio (ACLR) or a dynamic error vector magnitude (EVM) is enabled, select the ACLR or the EVM after determining that use of a dynamic ACLR or a dynamic EVM is enabled, transmit the ACLR or the EVM to the second wireless communication device, and receive at least one parameter indicative of the non-linear distortion function based on the ACLR or EVM from the second wireless communication device.

At block 1312, the first wireless communication device may generate an estimate of a non-linear distortion component of the data signal based on the second signal and the scaled sliced signal. In some examples, the generation of the estimate of the non-linear distortion component by the first wireless communication device may include subtracting the scaled sliced signal from the second signal (e.g., $\hat{d}^0=\text{Clipping}(\hat{x}^0)-\alpha\hat{x}$ of Table 1). In some examples, the signal reconstruction circuitry 1242 may provide a means to generate an estimate of a non-linear distortion component of a data signal based on a second signal and a scaled sliced signal.

At block 1314, the first wireless communication device may generate an estimate of the first signal based on the estimate of the non-linear distortion component (e.g., $y(x)-\hat{d}$ of Table 1). In some examples, the signal reconstruction circuitry 1242, shown and described above in connection with FIG. 12, may provide a means to generate an estimate of the first signal based on the estimate of the non-linear distortion component.

In some examples, the first wireless communication device may perform an iterative process that includes the slicing the received data signal, the clipping the sliced signal, and the generating the estimate of the non-linear distortion component. In some examples, the iterative process may include a Bussgang decomposition algorithm. In some examples, the iterative process further may include iteratively estimating a clipping threshold for the clipping.

In some examples, the iterative process may involve generating a corrected data signal based on the estimate of the non-linear distortion component, scaling the corrected data signal to provide a scaled corrected data signal, slicing the scaled corrected data signal to provide a second sliced signal, clipping the second sliced signal to provide a third signal, generating second estimate of the non-linear distortion component of the corrected data signal based on the third signal, and generating the estimate of the first signal based on the second estimate of the non-linear distortion component.

In some examples, the first wireless communication device may determine that use of a dynamic adjusted channel leakage ratio (ACLR) is enabled. In some examples, the first wireless communication device may select the ACLR based on a first frequency allocation for the second wireless communication device and a second frequency allocation adjacent the first frequency allocation. In some examples, the first wireless communication device may select the ACLR based on a first frequency allocation for the second wireless communication device and an absence of a frequency allocation adjacent the first frequency allocation. In some examples, the first wireless communication device may select the ACLR based on a modulation scheme configured for a third wireless communication device that is scheduled on a first frequency allocation that is adjacent a second frequency allocation for the second wireless communication device.

Figure 14:
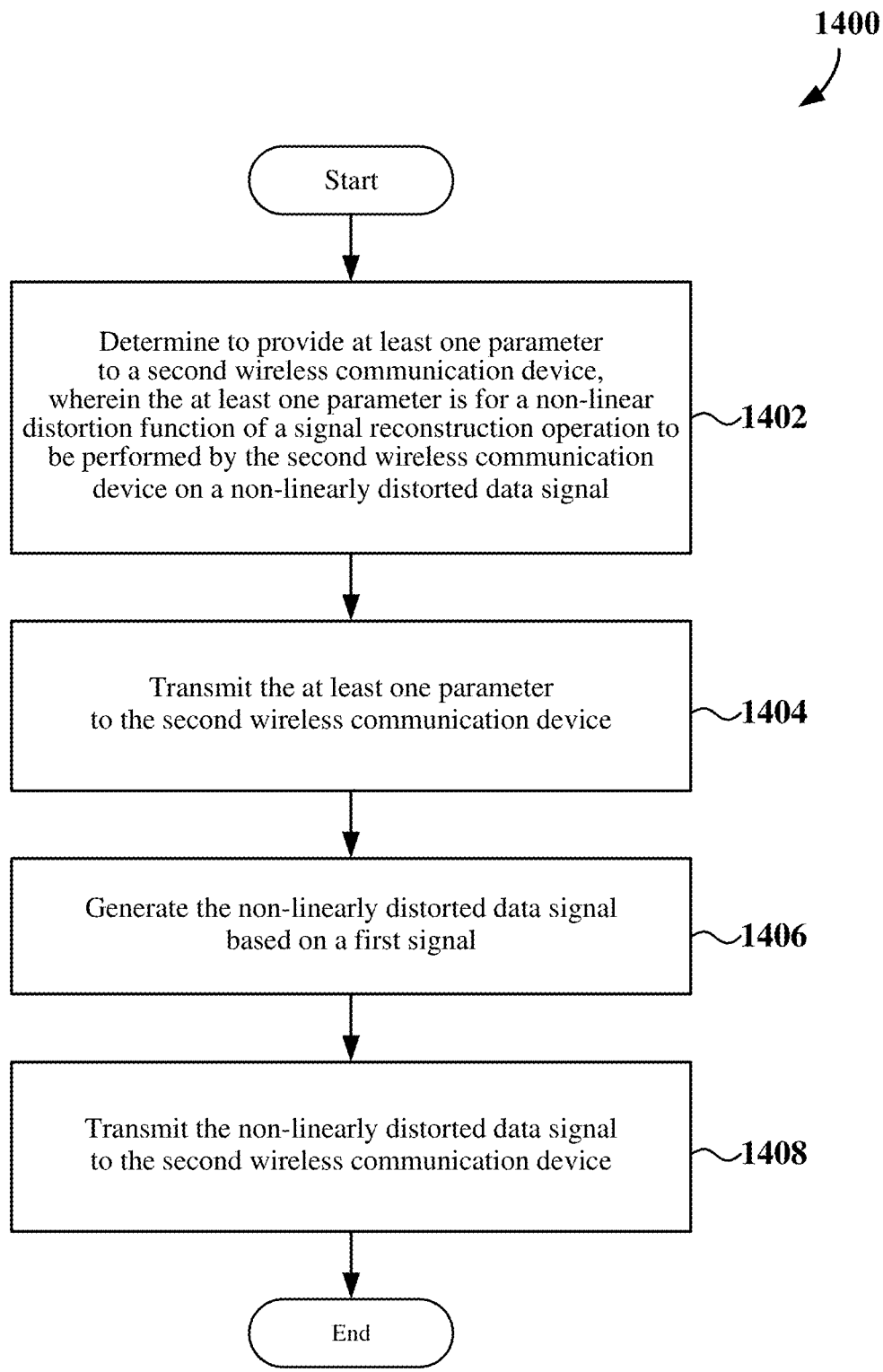
FIG. 14 is a flowchart illustrating an example process for transmitting at least one parameter according to some aspects.

FIG. 14 is a flow chart illustrating an example method 1400 for wireless communication in accordance with some aspects of the present disclosure. As described below, some or all illustrated features may be omitted in a particular implementation within the scope of the present disclosure, and some illustrated features may not be required for implementation of all examples. In some examples, the method 1400 may be carried out by the wireless communication device 1200 illustrated in FIG. 12. In some examples, the method 1400 may be carried out by any suitable apparatus or means for carrying out the functions or algorithm described below.

At block 1402, a first wireless communication device may determine to provide at least one parameter to a second wireless communication device, wherein the at least one parameter is for a non-linear distortion function of a signal reconstruction operation to be performed by the second wireless communication device on a non-linearly distorted data signal. In some examples, the parameter processing circuitry 1244, shown and described above in connection with FIG. 12, may provide a means to determine to provide at least one parameter to a second wireless communication device.

In some examples, the determination by the first wireless communication device to provide at least one parameter to the second wireless communication device may include determining a channel condition between the first wireless communication device and the second wireless communication device, and determining that the channel condition meets a threshold condition. In some examples, the determination by the first wireless communication device to provide at least one parameter to the second wireless communication device may include determining a signal-to-noise ratio (SNR) between the first wireless communication device and the second wireless communication device, and determining that the SNR is less than or equal to an SNR threshold.

At block 1404, the first wireless communication device may transmit the at least one parameter to the second wireless communication device. In some examples, the communication and processing circuitry 1241 and the transceiver 1210, shown and described above in connection with FIG. 12, may provide a means to transmit the at least one parameter to the second wireless communication device.

At block 1406, the first wireless communication device may generate the non-linearly distorted data signal based on a first signal. In some examples, the threshold processing circuitry 1243, shown and described above in connection with FIG. 12, may provide a means to generate the non-linearly distorted data signal based on a first signal.

In some examples, the generation of the non-linearly distorted data signal by the first wireless communication device may include apply a clipping threshold (e.g., the clipping threshold 520 of FIG. 5) to the first signal. In some examples, the transmission of the at least one parameter by the first wireless communication device may include transmitting the clipping threshold to the second wireless communication device.

At block 1408, the first wireless communication device may transmit the non-linearly distorted data signal to the second wireless communication device. In some examples, the communication and processing circuitry 1241 and the transceiver 1210, shown and described above in connection with FIG. 12, may provide a means to transmit the non-linearly distorted data signal to the second wireless communication device.

In some examples, the first wireless communication device may receive an indication from the second wireless communication device, where the indication specifies an adjusted channel leakage ratio (ACLR), an error vector magnitude (EVM), or a peak-to-average power ratio (PAPR). In some examples, the first wireless communication device may select a clipping threshold for clipping the first signal based on the ACLR, the EVM, or the PAPR. In this case, the transmission of the at least one parameter by the first wireless communication device may include transmitting the clipping threshold to the second wireless communication device.

Figure 15:
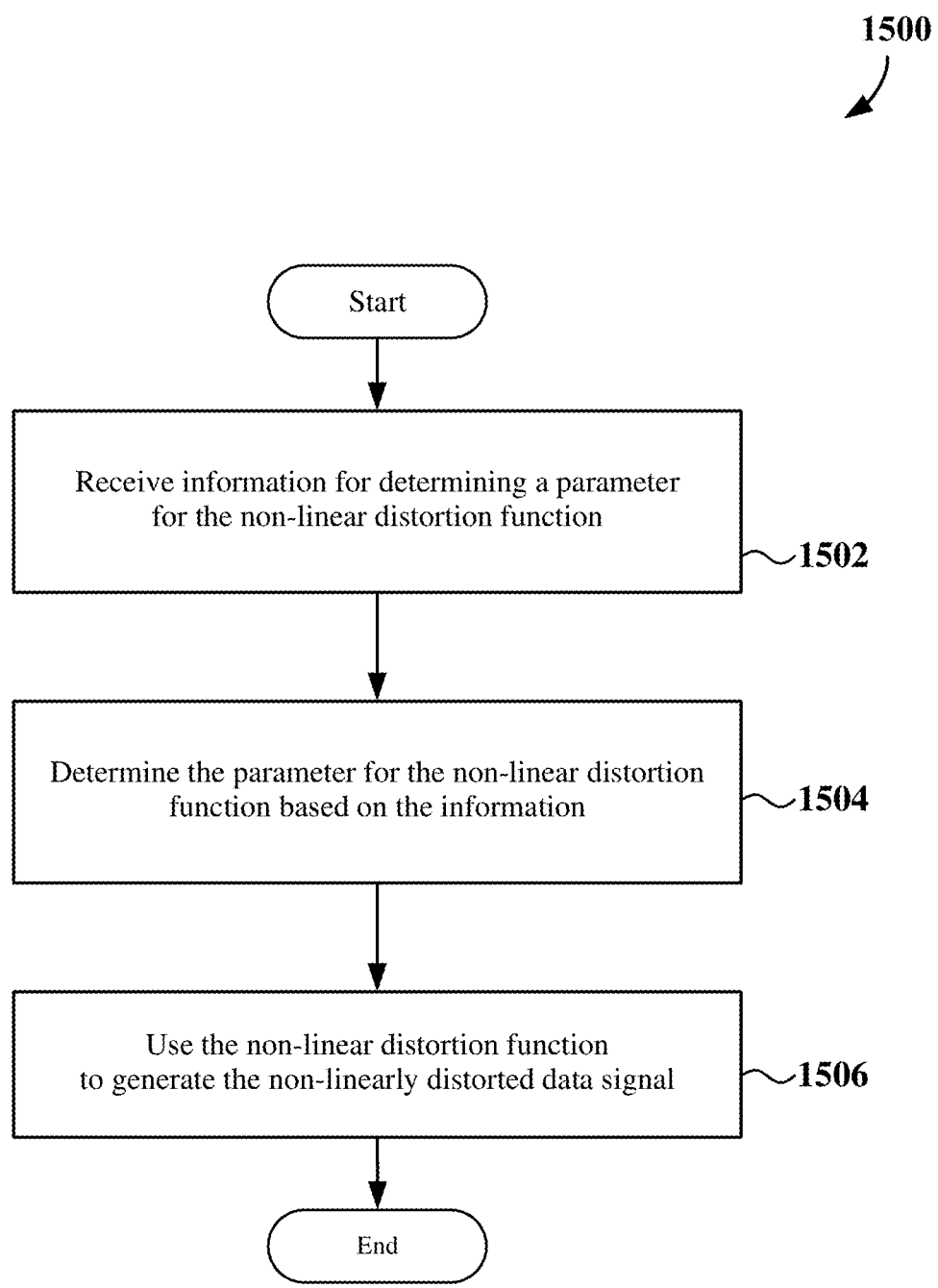
FIG. 15 is a flowchart illustrating another example process for transmitting at least one parameter according to some aspects.

FIG. 15 is a flow chart illustrating an example method 1500 for wireless communication in accordance with some aspects of the present disclosure. In some examples, the method 1500 may be used in conjunction with (e.g., in addition to or as part of) the method 1400 of FIG. 14. As described below, some or all illustrated features may be omitted in a particular implementation within the scope of the present disclosure, and some illustrated features may not be required for implementation of all examples. In some examples, the method 1500 may be carried out by the wireless communication device 1200 illustrated in FIG. 12. In some examples, the method 1500 may be carried out by any suitable apparatus or means for carrying out the functions or algorithm described below.

At block 1502, a wireless communication device may receive information for determining a parameter for the non-linear distortion function. In some examples, the parameter processing circuitry 1244 together with the communication and processing circuitry 1241 and the transceiver 1210, shown and described above in connection with FIG. 12, may provide a means to receive information for determining a parameter for the non-linear distortion function.

At block 1504, the wireless communication device may determine the parameter for the non-linear distortion function based on the information. In some examples, the threshold processing circuitry 1243, shown and described above in connection with FIG. 12, may provide a means to determine the parameter for the non-linear distortion function based on the information.

At block 1506, the wireless communication device may use the non-linear distortion function to generate the non-linearly distorted data signal. In some examples, the signal reconstruction circuitry 1242, shown and described above in connection with FIG. 12, may provide a means to use the non-linear distortion function to generate the non-linearly distorted data signal.

In one configuration, the wireless communication device 1200 includes means for receiving a data signal from a second wireless communication device, wherein the data signal is based on a first signal and comprises a non-linear distortion, means for scaling the data signal to provide a scaled signal, means for slicing the scaled signal to provide a sliced signal, means for scaling the sliced signal to provide a scaled sliced signal, means for applying a non-linear distortion function to the sliced signal to provide a second signal, means for generating an estimate of a non-linear distortion component of the data signal based on the second signal and the scaled sliced signal, and means for generating an estimate of the first signal based on the estimate of the non-linear distortion component. In one configuration, the wireless communication device 1200 includes means for determining to provide at least one parameter to a second wireless communication device, wherein the at least one parameter is for a non-linear distortion function of a signal reconstruction operation to be performed by the second wireless communication device on a non-linearly distorted data signal, means for transmitting the at least one parameter to the second wireless communication device, means for generating the non-linearly distorted data signal based on a first signal, and means for transmitting the non-linearly distorted data signal to the second wireless communication device. In one aspect, the aforementioned means may be the processor 1204 shown in FIG. 12 configured to perform the functions recited by the aforementioned means. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable medium 1206, or any other suitable apparatus or means described in any one or more of FIGS. 1, 2, 5, 7, 8, 9, 10, 11, and 12, and utilizing, for example, the processes and/or algorithms described herein in relation to FIGS. 13-15.

The methods shown in FIGS. 13-15 may include additional aspects, such as any single aspect or any combination of aspects described below and/or in connection with one or more other processes described elsewhere herein. The following provides an overview of several aspects of the present disclosure.

Aspect 1: A method for wireless communication at a wireless communication device, the method comprising: receiving a data signal from a second wireless communication device, wherein the data signal is based on a first signal and comprises a non-linear distortion; scaling the data signal to provide a scaled signal; slicing the scaled signal to provide a sliced signal; scaling the sliced signal to provide a scaled sliced signal; applying a non-linear distortion function to the sliced signal to provide a second signal; generating an estimate of a non-linear distortion component of the data signal based on the second signal and the scaled sliced signal; and generating an estimate of the first signal based on the estimate of the non-linear distortion component.

Aspect 2: The method of aspect 1, wherein the slicing the scaled signal comprises: applying a fast Fourier transform to the scaled signal to provide a frequency domain signal; slicing the frequency domain signal to provide a sliced frequency domain signal; and applying an inverse fast Fourier transform to the sliced frequency domain signal to provide a time domain signal.

Aspect 3: The method of aspect 1 or 2, wherein the generating the estimate of the non-linear distortion component comprises: subtracting the scaled sliced signal from the second signal.

Aspect 4: The method of any of aspects 1 through 3, further comprising: performing an iterative process that includes the scaling the data signal, the slicing the scaled signal, the scaling the sliced signal, the applying the non-linear distortion function, and the generating the estimate of the non-linear distortion component.

Aspect 5: The method of aspect 4, wherein the iterative process comprises a Bussgang decomposition algorithm.

Aspect 6: The method of any of aspects 4 through 5, wherein the iterative process further comprises: generating a corrected data signal based on the estimate of the non-linear distortion component; scaling the corrected data signal to provide a scaled corrected data signal; slicing the scaled corrected data signal to provide a second sliced signal; scaling the second sliced signal to provide a second scaled sliced signal; applying the non-linear distortion function to the second scaled sliced signal to provide a third signal; generating a second estimate of the non-linear distortion component of the corrected data signal based on the third signal and the second scaled sliced signal; and generating the estimate of the first signal based on the second estimate of the non-linear distortion component.

Aspect 7: The method of any of aspects 4 through 6, wherein the iterative process further comprises: iteratively estimating a threshold for the non-linear distortion function.

Aspect 8: The method of any of aspects 1 through 7, wherein the applying the non-linear distortion function to the sliced signal comprises: applying at least one parameter indicative of the non-linear distortion function to the sliced signal.

Aspect 9: The method of aspect 8, further comprising: receiving the at least one parameter indicative of the non-linear distortion function from the second wireless communication device.

Aspect 10: The method of aspect 8, wherein: the at least one parameter indicative of the non-linear distortion function comprises a clipping threshold; and the method further comprises estimating the clipping threshold from the data signal.

Aspect 11: The method of aspect 10, wherein the estimating the clipping threshold from the data signal comprises: estimating the clipping threshold based on a maximum amplitude of the data signal.

Aspect 12: The method of any of aspects 10 through 11, wherein the estimating the clipping threshold from the data signal comprises: applying equalization to the data signal to provide an equalized signal; applying an inverse fast Fourier transform to the equalized signal to provide a time domain signal; measuring a maximum amplitude of the time domain signal; and estimating the clipping threshold based on the maximum amplitude.

Aspect 13: The method of any of aspects 10 through 12, wherein the estimating the clipping threshold from the data signal comprises: estimating the clipping threshold based on an average maximum amplitude of the data signal or based on a histogram of the maximum amplitude of the data signal.

Aspect 14: The method of any of aspects 8 through 13, further comprising: selecting the at least one parameter indicative of the non-linear distortion function based on a standard-specified adjusted channel leakage ratio (ACLR) or a standard-specified error vector magnitude (EVM).

Aspect 15: The method of any of aspects 8 through 14, further comprising: receiving an indication from the second wireless communication device, wherein the indication specifies an adjusted channel leakage ratio (ACLR), an error vector magnitude (EVM), or a peak-to-average power ratio (PAPR); and selecting the at least one parameter indicative of the non-linear distortion function based on the ACLR, the EVM, or the PAPR.

Aspect 16: The method of any of aspects 8 through 15, further comprising: receiving an indication from the second wireless communication device, wherein the indication specifies a peak-to-average power ratio (PAPR); and selecting the at least one parameter indicative of the non-linear distortion function based on the PAPR.

Aspect 17: The method of any of aspects 1 through 16, further comprising: determining that use of a dynamic adjusted channel leakage ratio (ACLR) or a dynamic error vector magnitude (EVM) is enabled; selecting the ACLR or the EVM after determining that use of a dynamic ACLR or a dynamic EVM is enabled; transmitting the ACLR or the EVM to the second wireless communication device; and receiving at least one parameter indicative of the non-linear distortion function based on the ACLR or EVM from the second wireless communication device.

Aspect 18: The method of any of aspects 1 through 17, further comprising: determining that use of a dynamic adjusted channel leakage ratio (ACLR) is enabled; and selecting the ACLR based on a first frequency allocation for the second wireless communication device and a second frequency allocation adjacent the first frequency allocation, or selecting the ACLR based on a first frequency allocation for the second wireless communication device and an absence of a frequency allocation adjacent the first frequency allocation, or selecting the ACLR based on a modulation scheme configured for a third wireless communication device that is scheduled on a first frequency allocation that is adjacent a second frequency allocation for the second wireless communication device.

Aspect 19: The method of any of aspects 1 through 18, wherein: the non-linear distortion is due to clipping of the first signal; and the applying the non-linear distortion function to the sliced signal comprises clipping the sliced signal.

Aspect 20: The method of any of aspects 1 through 19, wherein the scaling comprises Bussgang scaling that uses a Bussgang coefficient.

Aspect 22: A method for wireless communication at a wireless communication device, the method comprising: determining to provide at least one parameter to a second wireless communication device, wherein the at least one parameter is for a non-linear distortion function of a signal reconstruction operation to be performed by the second wireless communication device on a non-linearly distorted data signal; transmitting the at least one parameter to the second wireless communication device; generating the non-linearly distorted data signal based on a first signal; and transmitting the non-linearly distorted data signal to the second wireless communication device.

Aspect 23: The method of aspect 22, wherein the determining to provide at least one parameter to the second wireless communication device comprises: determining a channel condition between the first wireless communication device and the second wireless communication device; and determining that the channel condition meets a threshold condition.

Aspect 24: The method of any of aspects 22 through 23, wherein the determining to provide at least one parameter to the second wireless communication device comprises: determining a signal-to-noise ratio (SNR) between the first wireless communication device and the second wireless communication device; and determining that the SNR is less than or equal to an SNR threshold.

Aspect 25: The method of any of aspects 22 through 24, wherein the generating the non-linearly distorted data signal based on a first signal comprises: applying a clipping threshold to the first signal.

Aspect 26: The method of aspect 25, wherein the transmitting the at least one parameter to the second wireless communication device comprises: transmitting the clipping threshold to the second wireless communication device.

Aspect 27: The method of any of aspects 22 through 26, further comprising: receiving an indication from the second wireless communication device, wherein the indication specifies an adjusted channel leakage ratio (ACLR), an error vector magnitude (EVM), or a peak-to-average power ratio (PAPR); and selecting a clipping threshold for clipping the first signal based on the ACLR, the EVM, or the PAPR.

Aspect 28: The method of aspect 27, transmitting the at least one parameter to the second wireless communication device comprises: transmitting the clipping threshold to the second wireless communication device.

Aspect 29: The method of any of aspects 22 through 28, further comprising: receiving information for determining a parameter for the non-linear distortion function; determining the parameter for the non-linear distortion function based on the information; and using the non-linear distortion function to generate the non-linearly distorted data signal.

Aspect 30: A wireless communication device comprising: a transceiver configured to communicate with a radio access network, a memory, and a processor communicatively coupled to the transceiver and the memory, wherein the processor and the memory are configured to perform any one of aspects 1 through 20.

Aspect 31: An apparatus configured for wireless communication comprising at least one means for performing any one of aspects 1 through 20.

Aspect 32: A non-transitory computer-readable medium storing computer-executable code, comprising code for causing an apparatus to perform any one of aspects 1 through 20.

Aspect 33: A wireless communication device comprising: a transceiver, a memory, and a processor communicatively coupled to the transceiver and the memory, wherein the processor and the memory are configured to perform any one of aspects 22 through 29.

Aspect 34: An apparatus configured for wireless communication comprising at least one means for performing any one of aspects 22 through 29.

Aspect 35: A non-transitory computer-readable medium storing computer-executable code, comprising code for causing an apparatus to perform any one of aspects 22 through 29.

Several aspects of a wireless communication network have been presented with reference to example implementations. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1, 2, 5, 7, 8, 9, 10, 11, and 12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for wireless communication at a first wireless communication device, the method comprising:
    receiving a data signal from a second wireless communication device, wherein the data signal is based on a first signal and comprises a non-linear distortion;
    scaling the data signal to provide a scaled signal;
    slicing the scaled signal to provide a sliced signal;
    scaling the sliced signal to provide a scaled sliced signal;
    applying a non-linear distortion function to the sliced signal to provide a second signal;
    generating an estimate of a non-linear distortion component of the data signal based on the second signal and the scaled sliced signal; and
    generating an estimate of the first signal based on the estimate of the non-linear distortion component.

2. The method of claim 1, wherein the slicing the scaled signal comprises:
    applying a fast Fourier transform to the scaled signal to provide a frequency domain signal;
    slicing the frequency domain signal to provide a sliced frequency domain signal; and
    applying an inverse fast Fourier transform to the sliced frequency domain signal to provide a time domain signal.

3. The method of claim 1, wherein the generating the estimate of the non-linear distortion component comprises:
    subtracting the scaled sliced signal from the second signal.

4. The method of claim 1, further comprising:
    performing an iterative process that includes the scaling the data signal, the slicing the scaled signal, the scaling the sliced signal, the applying the non-linear distortion function, and the generating the estimate of the non-linear distortion component.

5. The method of claim 4, wherein the iterative process comprises a Bussgang decomposition algorithm.

6. The method of claim 4, wherein the iterative process further comprises:
    generating a corrected data signal based on the estimate of the non-linear distortion component;
    scaling the corrected data signal to provide a scaled corrected data signal;
    slicing the scaled corrected data signal to provide a second sliced signal;
    scaling the second sliced signal to provide a second scaled sliced signal;
    applying the non-linear distortion function to the second scaled sliced signal to provide a third signal;
    generating a second estimate of the non-linear distortion component of the corrected data signal based on the third signal and the second scaled sliced signal; and
    generating the estimate of the first signal based on the second estimate of the non-linear distortion component.

7. The method of claim 4, wherein the iterative process further comprises:
    iteratively estimating a threshold for the non-linear distortion function.

8. The method of claim 1, wherein the applying the non-linear distortion function to the sliced signal comprises:
    applying at least one parameter indicative of the non-linear distortion function to the sliced signal.

9. The method of claim 8, further comprising:
    receiving the at least one parameter indicative of the non-linear distortion function from the second wireless communication device.

10. The method of claim 8, wherein:
    the at least one parameter indicative of the non-linear distortion function comprises a clipping threshold; and
    the method further comprises estimating the clipping threshold from the data signal.

11. The method of claim 10, wherein the estimating the clipping threshold from the data signal comprises:
    estimating the clipping threshold based on a maximum amplitude of the data signal.

12. The method of claim 10, wherein the estimating the clipping threshold from the data signal comprises:
    applying equalization to the data signal to provide an equalized signal;
    applying an inverse fast Fourier transform to the equalized signal to provide a time domain signal;
    measuring a maximum amplitude of the time domain signal; and
    estimating the clipping threshold based on the maximum amplitude.

13. The method of claim 10, wherein the estimating the clipping threshold from the data signal comprises:
    estimating the clipping threshold based on an average maximum amplitude of the data signal or based on a histogram of maximum amplitudes of the data signal.

14. The method of claim 8, further comprising:
    selecting the at least one parameter indicative of the non-linear distortion function based on a standard-specified adjusted channel leakage ratio (ACLR) or a standard-specified error vector magnitude (EVM).

15. The method of claim 8, further comprising:
    receiving an indication from the second wireless communication device, wherein the indication specifies an adjusted channel leakage ratio (ACLR), an error vector magnitude (EVM), or a peak-to-average power ratio (PAPR); and selecting the at least one parameter indicative of the non-linear distortion function based on the ACLR, the EVM, or the PAPR.

16. The method of claim 8, further comprising:
receiving an indication from the second wireless communication device, wherein the indication specifies a peak-to-average power ratio (PAPR); and
selecting the at least one parameter indicative of the non-linear distortion function based on the PAPR.

17. The method of claim 1, further comprising:
determining that use of a dynamic adjusted channel leakage ratio (ACLR) or a dynamic error vector magnitude (EVM) is enabled;
selecting an ACLR or an EVM after the determining that use of the dynamic ACLR or the dynamic EVM is enabled;
transmitting the ACLR or the EVM to the second wireless communication device; and
receiving at least one parameter indicative of the non-linear distortion function based on the ACLR or the EVM from the second wireless communication device.

18. The method of claim 1, further comprising:
determining that use of a dynamic adjusted channel leakage ratio (ACLR) is enabled; and
selecting an ACLR based on a first frequency allocation for the second wireless communication device and a second frequency allocation adjacent the first frequency allocation, or selecting the ACLR based on a first frequency allocation for the second wireless communication device and an absence of a frequency allocation adjacent the first frequency allocation, or selecting the ACLR based on a modulation scheme configured for a third wireless communication device that is scheduled on a first frequency allocation that is adjacent a second frequency allocation for the second wireless communication device.

19. The method of claim 1, wherein:
the non-linear distortion is due to clipping of the first signal; and
the applying the non-linear distortion function to the sliced signal comprises clipping the sliced signal.

20. The method of claim 1, wherein the scaling comprises Bussgang scaling that uses a Bussgang coefficient.

21. A first wireless communication device, comprising:
a transceiver;
a memory; and
a processor coupled to the transceiver and the memory, wherein the processor and the memory are configured to:
receive a data signal from a second wireless communication device via the transceiver, wherein the data signal is based on a first signal and comprises a non-linear distortion;
scale the data signal to provide a scaled signal;
slice the scaled signal to provide a sliced signal;
scale the sliced signal to provide a scaled sliced signal;
apply a non-linear distortion function to the sliced signal to provide a second signal;
generate an estimate of a non-linear distortion component of the data signal based on the second signal and the scaled sliced signal; and
generate an estimate of the first signal based on the estimate of the non-linear distortion component.

22. A method for wireless communication at a first wireless communication device, the method comprising:
transmitting at least one parameter to a second wireless communication device for a non-linear distortion function of a signal reconstruction operation to be performed by the second wireless communication device on a non-linearly distorted data signal, wherein the at least one parameter is based on an adjusted channel leakage ratio (ACLR), an error vector magnitude (EVM), or a peak-to-average power ratio (PAPR);
generating the non-linearly distorted data signal based on a first signal and the at least one parameter; and
transmitting the non-linearly distorted data signal to the second wireless communication device.

23. The method of claim 22, further comprising:
determining a channel condition between the first wireless communication device and the second wireless communication device; and
determining that the channel condition meets a threshold condition,
wherein the transmitting the at least one parameter to the second wireless communication device is responsive to the determining that the channel condition meets the threshold condition.

24. The method of claim 22, further comprising:
determining a signal-to-noise ratio (SNR) between the first wireless communication device and the second wireless communication device; and
determining that the SNR is less than or equal to an SNR threshold,
wherein the transmitting the at least one parameter to the second wireless communication device is responsive to the determining that the SNR is less than or equal to the SNR threshold.

25. The method of claim 22, wherein the generating the non-linearly distorted data signal based on a first signal comprises:
applying a clipping threshold to the first signal.

26. The method of claim 25, wherein the transmitting the at least one parameter to the second wireless communication device comprises:
transmitting the clipping threshold to the second wireless communication device.

27. The method of claim 22, further comprising:
receiving an indication from the second wireless communication device, wherein the indication specifies the ACLR, the EVM, or the PAPR; and
selecting a clipping threshold for clipping the first signal based on the ACLR, the EVM, or the PAPR.

28. The method of claim 27, wherein the transmitting the at least one parameter to the second wireless communication device comprises:
transmitting the clipping threshold to the second wireless communication device.

29. The method of claim 22, further comprising:
receiving information for determining a parameter for the non-linear distortion function;
determining the parameter for the non-linear distortion function based on the information; and
using the non-linear distortion function to generate the non-linearly distorted data signal.

30. A first wireless communication device, comprising:
a transceiver;
a memory; and
a processor coupled to the transceiver and the memory, wherein the processor and the memory are configured to:
transmit at least one parameter to a second wireless communication device via the transceiver, wherein the at least one parameter is for a non-linear distortion function of a signal reconstruction operation to be performed by the second wireless communication device on a non-linearly distorted data signal, and wherein the at least one parameter is based on an adjusted channel leakage ratio (ACLR), an error vector magnitude (EVM), or a peak-to-average power ratio (PAPR);

generate the non-linearly distorted data signal based on a first signal and the at least one parameter; and transmit the non-linearly distorted data signal to the second wireless communication device via the transceiver.

\* \* \* \* \*